United States Patent
Yasuda

(10) Patent No.: US 6,504,168 B2
(45) Date of Patent: Jan. 7, 2003

(54) RADIATION IMAGE READ-OUT METHOD AND APPARATUS

(75) Inventor: Hiroaki Yasuda, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 26 days.

(21) Appl. No.: 09/880,102

(22) Filed: Jun. 14, 2001

(65) Prior Publication Data

US 2002/0014605 A1 Feb. 7, 2002

(30) Foreign Application Priority Data

Jun. 14, 2000 (JP) .................................... 2000/178327
Oct. 24, 2000 (JP) .................................... 2000/324251

(51) Int. Cl.⁷ ............................................. G03B 42/02
(52) U.S. Cl. ...................... 250/587; 250/586; 250/584
(58) Field of Search ............................. 250/587, 586, 250/584

(56) References Cited

U.S. PATENT DOCUMENTS

| | | | | |
|---|---|---|---|---|
| 4,571,635 A | * | 2/1986 | Mahmoodi et al. | ......... 250/581 |
| 4,803,359 A | * | 2/1989 | Hosoi et al. | ................. 250/581 |
| 4,816,679 A | | 3/1989 | Sunagawa et al. | |
| 4,837,436 A | * | 6/1989 | Whiting | ..................... 250/581 |
| 4,922,103 A | * | 5/1990 | Kawajiri et al. | ......... 250/484.4 |
| 5,796,113 A | * | 8/1998 | Nagli et al. | ................. 250/586 |
| 6,313,477 B1 | * | 11/2001 | Yasuda et al. | .............. 250/584 |

FOREIGN PATENT DOCUMENTS

| | | | | |
|---|---|---|---|---|
| JP | 60-111568 | | 6/1985 | |
| JP | 60-236354 | | 11/1985 | ............ H04N/1/04 |
| JP | 64013535 A | * | 1/1989 | ........... G03B/42/02 |
| JP | 1-101540 | | 4/1989 | ........... G03B/42/02 |

OTHER PUBLICATIONS

Abstract 01–101540 Apr. 19, 1989.

* cited by examiner

Primary Examiner—Constantine Hannaher
Assistant Examiner—Albert Gagliardi
(74) Attorney, Agent, or Firm—Sughrue Mion, PLLC

(57) ABSTRACT

Stimulating rays produced by a line light source are linearly irradiated onto an area of a stimulable phosphor sheet, on which a radiation image has been stored, and light emitted from the linear area of the sheet upon stimulation is photo-electrically converted by a line sensor. Outputs of several pixel regions of the line sensor, which are adjacent to one another along the length direction of the linear area of the sheet and have widths taken in the length direction of the linear area of the sheet such that a sum of the widths is equal to the width of one pixel in a final image, are added together in order to constitute an image signal component representing one pixel in the final image.

12 Claims, 5 Drawing Sheets

SECT. I-I

SECT. I-I

RADIATION IMAGE READ-OUT METHOD AND APPARATUS

BACKGROUND OF THE INVENTION

1. Field of the Invention

This invention relates to a radiation image read-out method and apparatus. This invention particularly relates to a radiation image read-out method and apparatus, wherein a radiation image having been stored on a stimulable phosphor sheet is read out with a line sensor.

2. Description of the Related Art

It has been proposed to use stimulable phosphors in radiation image recording and reproducing systems. Specifically, a radiation image of an object, such as a human body, is recorded on a stimulable phosphor sheet, which comprises a substrate and a layer of the stimulable phosphor overlaid on the substrate. Stimulating rays, such as a laser beam, are deflected land caused to scan pixels in the radiation image, which has been stored on the stimulable phosphor sheet, one after another. The stimulating rays cause the stimulable phosphor sheet to emit light in proportion to the amount of energy stored thereon during its exposure to the radiation. The light emitted successively from the pixels in the radiation image having been stored on the stimulable phosphor sheet, upon stimulation thereof, is photoelectrically detected and converted into an electric image signal by photoelectric read-out means. The stimulable phosphor sheet, from which the image signal has been detected, is then exposed to erasing light, and radiation energy remaining thereon is thereby released.

Also, a novel radiation image recording and reproducing system aiming at enhancement of a detection quantum efficiency in the formation of the radiation image, i.e., a radiation absorptivity, a light emission efficiency, an emitted light pickup efficiency, and the like, has been proposed in, for example, Japanese Patent Application No. 11(1999)-372978. With the proposed radiation image recording and reproducing system, the radiation absorbing functions and the energy storing functions of the conventional stimulable phosphor are separated from each other, and a phosphor having good radiation absorbing characteristics and a phosphor having good light emission response characteristics are utilized respectively for radiation absorption and radiation image storage. The phosphor having good radiation absorbing characteristics (i.e., the phosphor for radiation absorption) is caused to absorb the radiation and to emit light having wavelengths falling within an ultraviolet to visible region. Also, the phosphor having good light emission response characteristics (i.e., the phosphor for energy storage) is caused to absorb the light, which has been emitted by the phosphor having good radiation absorbing characteristics, and to store energy of the emitted light. The phosphor having good light emission response characteristics, on which the energy of the emitted light has been stored, is then exposed to light having wavelengths falling within a visible to infrared region, which light causes the phosphor having good light emission response characteristics to emit light in accordance with the stored energy. The light having thus been emitted by the phosphor having good light emission response characteristics is successively detected with photoelectric read-out means, and an image signal is thereby obtained.

The image signal, which has been obtained from the radiation image recording and reproducing systems described above, is then subjected to image processing, such as gradation processing and processing in the frequency domain, such that a visible radiation image, which has good image quality and can serve as an effective tool in, particularly, the efficient and accurate diagnosis of an illness, can be obtained. The image signal having been obtained from the image processing is utilized for reproducing a visible image for diagnosis (a final image) or the like, on film or on a high resolution cathode ray tube (CRT) display device. In cases where the stimulable phosphor sheet, from which the image signal has been detected, is then exposed to the erasing light, and energy remaining on the stimulable phosphor sheet is thereby released, the erased stimulable phosphor sheet is capable of being used again for the recording of a radiation image.

Novel radiation image read-out apparatuses for use in the radiation image recording and reproducing systems described above have been proposed in, for example, Japanese Unexamined Patent Publication Nos. 60(1985)-111568, 60(1985)-236354, and 1(1989)-101540. In the proposed radiation image read-out apparatuses, from the point of view of keeping the emitted light detection time short, reducing the size of the apparatus, and keeping the cost low, a line light source for irradiating linear stimulating rays onto a stimulable phosphor sheet is utilized as a stimulating ray source, and a line sensor comprising a plurality of photoelectric conversion devices arrayed along the length direction of a linear area of the stimulable phosphor sheet, onto which linear area the stimulating rays are irradiated by the line light source, is utilized as photoelectric read-out means. (The length direction of the linear area of the stimulable phosphor sheet will hereinbelow be referred to as the main scanning direction.) Also, the proposed radiation image read-out apparatuses comprise scanning means for moving the stimulable phosphor sheet with respect to the line light source and the line sensor and in a direction, which is approximately normal to the length direction of the linear area of the stimulable phosphor sheet. (The direction, which is approximately normal to the length direction of the linear area of the stimulable phosphor sheet, will hereinbelow be referred to as the sub-scanning direction.)

However, each of the photoelectric conversion devices constituting the line sensor, e.g. a charge coupled device (CCD) image sensor or a metal oxide semiconductor (MOS) image sensor, has limitation on an electric charge amount capable of being accumulated, and saturation is reached in the electric charge amount. Therefore, the photoelectric conversion devices are not capable of detecting a light intensity higher than a certain level. Accordingly, the problems occur in that accurate detection results cannot be obtained with respect to an area (a high dose area) on the stimulable phosphor sheet, at which a large amount of energy carrying the radiation image information has been stored. Thus the range of the light intensity which the line sensor is capable of detecting, i.e. a dynamic range of the line sensor, is narrow.

Accordingly, there has heretofore been proposed a technique for widening the dynamic range of the line sensor, wherein a width of each photoelectric conversion device of the line sensor, which width is taken in the sub-scanning direction, is set to be equal to a fraction of the width of one pixel in the final image, which width is taken in the sub-scanning direction, addition processing is performed on image signal components having been obtained from an identical photoelectric conversion device during several times of read-out stages consecutive in the sub-scanning direction, which read-out stages are performed by the identical photoelectric conversion device, an image signal component representing one pixel in the final image is obtained from the addition processing, and the dynamic range of the line sensor is thereby kept wide.

However, with the proposed technique for widening the dynamic range of the line sensor, in order for the addition processing to be performed on the outputs having been obtained with respect to the sub-scanning direction, it is at least necessary that the outputs of all of pixel regions of the line sensor arrayed in the main scanning direction, which outputs have been obtained from one time of the read-out stage, be stored in a storage device. The line sensor comprises a large number of the pixel regions arrayed along the main scanning direction. Therefore, the proposed technique for widening the dynamic range of the line sensor has the problems in that a storage device (a line memory) having a large storage capacity becomes necessary for storing the outputs of the pixel regions arrayed along the main scanning direction, and the cost cannot be kept low.

SUMMARY OF THE INVENTION

The primary object of the present invention is to provide a radiation image read-out method, wherein a dynamic range of a line sensor is capable of being kept wide such that a cost is capable of being kept low.

Another object of the present invention is to provide a radiation image read-out method, wherein outputs having been obtained from several photoelectric conversion devices of a line sensor which are adjacent to one another in a longitudinal direction of the line sensor, are added to one another in order to constitute one pixel in a final image, and wherein correction processing is capable of being performed such that a cost is capable of being kept low.

The specific object of the present invention is to provide an apparatus for carrying out the radiation image read-out method.

The present invention provides a first radiation image read-out method, comprising the steps of:

i) linearly irradiating stimulating rays, which have been produced by a line light source, onto an area of one surface of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, with a line sensor comprising a plurality of pixel regions arrayed along a length direction of the linear area of the stimulable phosphor sheet, the received light being subjected to photoelectric conversion performed by the line sensor, iii) moving the stimulable phosphor sheet with respect to the line light source and the line sensor and in a direction different from the length direction of the linear area of the stimulable phosphor sheet, iv) successively reading outputs of the line sensor in accordance with the movement, outputs of the pixel regions at respective positions of movement being thereby obtained, and v) obtaining a final image signal, which represents a final image, from the thus obtained outputs of the pixel regions at the respective positions of movement, wherein addition processing is performed on the outputs of a plurality of pixel regions constituting the line sensor, which pixel regions are adjacent to one another along the length direction of the linear area of the stimulable phosphor sheet, and which pixel regions have widths taken in the length direction of the linear area of the stimulable phosphor sheet such that a sum of the widths is equal to the width of one pixel in the final image, the width of the one pixel in the final image being taken in the length direction of the linear area of the stimulable phosphor sheet, an image signal component of the final image signal representing the final image, which image signal component represents one pixel in the final image, being thereby obtained.

In the first radiation image read-out method in accordance with the present invention, as the line light source, a fluorescent lamp, a cold cathode fluorescent lamp, a light emitting diode (LED) array, or the like, may be employed. The line light source may be a light source having a linear shape as in the cases of the fluorescent lamp. Alternatively, the line light source may be a light source operating such that the produced stimulating rays are formed into a line light beam. For example, the line light source may be a broad area laser, or the like. The stimulating rays radiated out from the line light source may be radiated out continuously. Alternatively, the stimulating rays radiated out from the line light source may be radiated out as pulsed stimulating rays, which are radiated out intermittently. From the point of view of reducing noise, the stimulating rays should preferably be pulsed stimulating rays having a high intensity.

As will be understood from the specification, it should be noted that the term "moving a stimulable phosphor sheet with respect to a line light source and a line sensor" as used herein means movement of the stimulable phosphor sheet relative to the line light source and the line sensor, and embraces the cases wherein the stimulable phosphor sheet is moved while the line light source and the line sensor are kept stationary, the cases wherein the line light source and the line sensor are moved while the stimulable phosphor sheet is kept stationary, and the cases wherein both the stimulable phosphor sheet and the line light source and the line sensor are moved. In cases where the line light source and the line sensor are moved, they should be moved together with each other.

The direction along which the stimulable phosphor sheet is moved with respect to the line light source and the line sensor (i.e., the direction different from the length direction of the exposed linear area of the stimulable phosphor sheet) should preferably be the direction approximately normal to the length direction of the exposed linear area of the stimulable phosphor sheet (i.e., should preferably be the minor axis direction). However, the direction along which the stimulable phosphor sheet is moved with respect to the line light source and the line sensor is not limited to the minor axis direction. For example, the stimulable phosphor sheet may be moved with respect to the line light source and the line sensor along an oblique direction with respect to the direction approximately normal to the length direction of the line light source and the line sensor or along a zigzag movement direction, such that approximately the entire surface of the stimulable phosphor sheet may be uniformly exposed to the stimulating rays.

The line light source and the line sensor may be located on the same surface side of the stimulable phosphor sheet or on opposite surface sides of the stimulable phosphor sheet. In cases where the line light source and the line sensor are located on opposite surface sides of the stimulable phosphor sheet, the substrate of the stimulable phosphor sheet, or the like, should be formed from a material permeable to the emitted light, such that the emitted light may permeate to the surface side of the stimulable phosphor sheet opposite to the surface on the stimulating ray incidence side.

As the line sensor, an amorphous silicon sensor, a CCD image sensor, a CCD image sensor with back illuminator, a MOS image sensor, or the like, may be employed.

The final image signal, which represents the final image, is the image signal at a stage of being subjected to processing in image processing means, image displaying means, image storing means, or the like, for processing a digital image signal. As described above, in order to constitute the image signal component of the final image signal representing the final image, which image signal component represents one pixel in the final image, the addition processing is performed on the outputs of the plurality of the pixel regions constituting the line sensor, which pixel regions are adjacent to one another along the length direction of the linear area of the stimulable phosphor sheet, and which pixel regions have widths taken in the length direction of the linear area of the stimulable phosphor sheet such that the sum of the widths is equal to the width of one pixel in the final image, the width of the one pixel in the final image being taken in the length direction of the linear area of the stimulable phosphor sheet. The addition processing may be a simple addition or a mean value calculating operation. When necessary, a weighted addition, masking operation processing, or the like, may be performed as the addition processing.

Such that a required memory capacity maybe kept small and the cost may be kept low, the addition processing on the outputs of the plurality of the pixel regions constituting the line sensor, which pixel regions are adjacent to one another along the length direction of the linear area of the stimulable phosphor sheet, should preferably be performed immediately to one another have been read.

Also, in the first radiation image read-out method in accordance with the present invention, the stimulable phosphor sheet for storing the radiation image may be an ordinary stimulable phosphor sheet comprising a stimulable phosphor for absorbing radiation and storing energy from the radiation, i.e. the radiation image.

Further, the first radiation image read-out method in accordance with the present invention may be employed in the radiation image recording and reproducing system proposed in, for example, Japanese Patent Application No. 11(1999)-372978. With the proposed radiation image recording and reproducing system, the radiation absorbing functions and the energy storing functions of the conventional stimulable phosphor are separated from each other, and a phosphor having good radiation absorbing characteristics and a phosphor having good light emission response characteristics are utilized respectively for radiation absorption and radiation image storage. The phosphor having good radiation absorbing characteristics (i.e., a phosphor for radiation absorption) is caused to absorb the radiation and to emit light having wavelengths falling within an ultraviolet to visible region. Also, the phosphor having good light emission response characteristics (i.e., a phosphor for energy storage) is caused to absorb the light, which has been emitted by the phosphor having good radiation absorbing characteristics, and to store energy of the emitted light. The phosphor having good light emission response characteristics, on which the energy of the emitted light has been stored, is then exposed to light having wavelengths falling within a visible to infrared region, which light causes the phosphor having good light emission response characteristics to emit light in accordance with the stored energy. The light having thus been emitted by the phosphor having good light emission response characteristics is successively detected with photoelectric read-out means, and an image signal is there by obtained. With the proposed radiation image recording and reproducing system, the detection quantum efficiency in the formation of the radiation image, i.e., the radiation absorptivity, the light emission efficiency, the emitted light pickup efficiency, and the like, is capable of being enhanced as a whole. Therefore, in the first radiation image read-out method in accordance with the present invention, the stimulable phosphor sheet should preferably contain the phosphor for energy storage described above.

The phosphor for energy storage absorbs the light having wavelengths falling within the ultraviolet to visible region, which light has been emitted by the phosphor for radiation absorption, and stores the energy of the emitted light as the image information. The light having wavelengths falling within the ultraviolet to visible region is the light emitted by the phosphor for radiation absorption when the phosphor for radiation absorption absorbs the radiation. Therefore, the image information having been stored on the phosphor for energy storage is also taken as the radiation image.

The present invention also provides an apparatus for carrying out the first radiation image read-out method in accordance with the present invention. Specifically, the present invention also provides a first radiation image read-out apparatus, comprising:

i) a line light source for linearly irradiating stimulating rays onto an area of one surface of a stimulable phosphor sheet, on which a radiation image has been stored, the stimulating rays causing the stimulable phosphor sheet to emit light in proportion to an amount of energy stored thereon during its exposure to radiation, ii) a line sensor for receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, and performing photoelectric conversion of the received light, iii) scanning means for moving the stimulable phosphor sheet with respect to the line light source and the line sensor and in a direction different from a length direction of the linear area of the stimulable phosphor sheet, and iv) reading means for successively reading outputs of the line sensor in accordance with the movement in order to obtain a final image signal, which represents a final image, wherein the line sensor comprises a plurality of pixel regions arrayed along the length direction of the linear area of the stimulable phosphor sheet, a width of each of the pixel regions constituting the line sensor, which width is taken in the length direction of the linear area of the stimulable phosphor sheet, is equal to a fraction of the width of one pixel in the final image, the width of the one pixel in the final image being taken in the length direction of the linear area of the stimulable phosphor sheet, and the reading means is provided with addition processing means for performing addition processing on the outputs of n number of pixel regions constituting the line sensor, which pixel regions are adjacent to one another along the length direction of the linear area of the stimulable phosphor sheet, where n represents an integral number of at least 2, in order to obtain an image signal component of the final image signal representing the final image, which image signal component represents one pixel in the final image.

In the first radiation image read-out apparatus in accordance. with the present invention, the reading means is provided with the addition processing means. The addition processing means performs the addition processing, such as the simple addition, the mean value calculating operation, the weighted addition, or the masking operation processing, on the outputs of the n number of the pixel regions constituting the line sensor, which pixel regions are adjacent to one another along the length direction of the linear area of the stimulable phosphor sheet, where n represents an integral number of at least 2. In this manner, the addition processing means constitutes the image signal component of the final image signal representing the final image carrying the radiation image information having been stored on the stimulable phosphor sheet, which image signal component represents one pixel in the final image.

Also, in the first radiation image read-out apparatus in accordance with the present invention, such that the required memory capacity may be kept small and the cost may be kept low, the addition processing means should preferably perform the addition processing on the outputs of the n number of the pixel regions constituting the line sensor, which pixel regions are adjacent to one another along the length direction of the linear area of the stimulable phosphor sheet, immediately after the outputs of the n number of the pixel regions adjacent to one another have been read.

Further, in the first radiation image read-out apparatus in accordance with the present invention, the stimulable phosphor sheet should preferably contain a stimulable phosphor (a phosphor for energy storage), which is capable of absorbing light having wavelengths falling within an ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

The present invention further provides a second radiation image read-out method, comprising the steps of:

i) linearly irradiating stimulating rays, which have been produced by a line light source, onto an area of one surface of a stimulable phosphor sheet, on which a radiation image has been stored, the stimulating rays causing the stimulable phosphor sheet to emit light in proportion to an amount of energy stored thereon during its exposure to radiation, ii) receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, with a line sensor comprising a plurality of photoelectric conversion devices arrayed along a length direction of the linear area of the stimulable phosphor sheet, the received light being subjected to photoelectric conversion performed by the line sensor, iii) moving the stimulable phosphor sheet with respect to the line light source and the line sensor and in a direction different from the length direction of the linear area of the stimulable phosphor sheet, iv) successively reading outputs of the photoelectric conversion devices constituting the line sensor in accordance with the movement, an initial image signal being thereby obtained, v) performing addition processing on image signal components of the initial image signal representing the outputs of a plurality of photoelectric conversion devices constituting the line sensor, which photoelectric conversion devices are adjacent to one another along the length direction of the linear area of the stimulable phosphor sheet, an image signal component of an intermediate image signal representing an intermediate image, which image signal component represents one pixel in the intermediate image, being thereby obtained, and vi) performing correction processing on the intermediate image signal, a final image signal, which represents a final image, being thereby obtained.

The term "initial image signal" as used herein means the image signal, which is made up of a series of image signal components representing the outputs of the photoelectric conversion devices constituting the line sensor, and which has not been subjected to the addition processing and the correction processing. The term "intermediate image signal" as used herein means the image signal, which has been obtained from the addition processing performed on the image signal components of the initial image signal, and which has not been subjected to the correction processing.

Also, the term "final image signal" as used herein means the image signal, which has been obtained by performing the addition processing and the correction processing on the initial image signal, and which is the image signal at the stage of being subjected to the processing in the image processing means, the image displaying means, the image storing means, or the like, for processing a digital image signal.

In the second radiation image read-out method in accordance with the present invention, in order to constitute the image signal component of the final image signal representing the final image, which image signal component represents one pixel in the final image, the addition processing is performed on the outputs of the plurality of the photoelectric conversion devices constituting the line sensor, which photoelectric conversion devices are adjacent to one another along the length direction of the linear area of the stimulable phosphor sheet, and which photoelectric conversion devices have widths taken in the length direction of the linear area of the stimulable phosphor sheet such that the sum of the widths is equal to the width of one pixel in the final image, the width of the one pixel in the final image being taken in the length direction of the linear area of the stimulable phosphor sheet. The addition processing may be the simple addition or the mean value calculating operation. When necessary, the weighted addition, the masking operation processing, or the like, may be performed as the addition processing.

Such that a required memory capacity may be kept small, the addition processing should preferably be performed immediately after the outputs of the plurality of the photoelectric conversion devices constituting the line sensor, which photoelectric conversion devices are adjacent to one another along the length direction of the linear area of the stimulable phosphor sheet, have been read.

Also, in the second radiation image read-out method in accordance with the present invention, the correction processing should preferably contain at least one of correction processing for compensation for dark current (i.e., processing for compensation for signal components outputted from the photoelectric conversion devices when no light impinges upon the photoelectric conversion devices), correction processing for compensation for sensitivity (i.e., processing for compensation for variation in sensitivity among the photoelectric conversion devices), correction processing for compensation for linearity, correction processing for compensation for shading (i.e., processing for compensation for shading occurring due to nonuniformity of the stimulating rays and nonuniformity of the read-out optical system), and logarithmic conversion processing.

In the second radiation image read-out method in accordance with the present invention, the correction processing may be performed in one of various ways. Such that the calculations can be performed quickly and easily, the correction processing should preferably be performed by utilizing a table, such as a look-up table (LUT), with which at least two kinds of processings (e.g., the correction processing for compensation for sensitivity and the correction processing for compensation for shading) among the processings for the correction processing are capable of being performed with one time of table conversion processing.

In the second radiation image read-out method in accordance with the present invention, as in the first radiation image read-lout method in accordance with the present invention, as the line light source, the fluorescent lamp, the cold cathode fluorescent lamp, the light emitting diode (LED) array, or the like, may be employed. The line light source may be a light source having a linear shape as in the cases of the fluorescent lamp. Alternatively, the line light source may be a light source operating such that the produced stimulating rays are formed into a line light beam. For example, the line light source may be a broad area laser, or the like. The stimulating rays radiated out from the line light source maybe radiated out continuously. Alternatively, the stimulating rays radiated out from the line light source may be radiated out as pulsed stimulating rays, which are radiated out intermittently. From the point of view of reducing noise, the stimulating rays should preferably be pulsed stimulating rays having a high intensity.

Also, in the second radiation image read-out method in accordance with the present invention, as in the first radiation image read-out method in accordance with the present invention the direction along which the stimulable phosphor sheet is moved with respect to the line light source and the line sensor (i.e., the direction different from the length direction of the exposed linear area of the stimulable phosphor sheet) should preferably be the direction approximately normal to the length direction of the exposed linear area of the stimulable phosphor sheet (i.e., should preferably be the minor axis direction). However, the direction along which the stimulable phosphor sheet is moved with respect to the line light source and the line sensor. is not limited to the minor axis direction.

Further, in the second radiation image read-out method in accordance with the present invention, as in the first radiation image read-out method in accordance with the present invention, the line light source and the line sensor may be located on the same surface side of the stimulable phosphor sheet or on opposite surface sides of the stimulable phosphor sheet.

Furthermore, in the second radiation image read-out method in accordance with the present invention, as the line sensor, the amorphous silicon sensor, the CCD image sensor, the CCD image sensor with back illuminator, the MOS image sensor, or the like, may be employed.

Also, in the second radiation image read-out method in accordance with the present invention, the stimulable phosphor sheet should preferably contain the stimulable phosphor (the phosphor for energy storage), which is capable of absorbing light having wavelengths falling within an ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

The present invention still further provides an apparatus for carrying out the second radiation image read-out method in accordance with the present invention. Specifically, the present invention still further provides a second radiation image read-out apparatus, comprising:

i) a line light source for linearly irradiating stimulating rays onto an area of one surface of a stimulable phosphor sheet, on which a radiation image has been stored, the stimulating rays causing the stimulable phosphor sheet to emit light in proportion to an amount of energy stored thereon during its exposure to radiation, ii) a line sensor for receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, and performing photoelectric conversion of the received light, the line sensor comprising a plurality of photoelectric conversion devices arrayed along a length direction of the linear area of the stimulable phosphor sheet, iii) scanning means for moving the stimulable phosphor sheet with respect to the line light source and the line sensor and in a direction different from the length direction of the linear area of the stimulable phosphor sheet, iv) reading means for successively reading outputs of the photoelectric conversion devices constituting the line sensor in accordance with the movement in order to obtain an initial image signal, v) consolidation processing means for performing addition processing on image signal components of the initial image signal representing the outputs of a plurality of photoelectric conversion devices constituting the line sensor, which photoelectric conversion devices are adjacent to one another along the length direction of the linear area of the stimulable phosphor sheet, in order to obtain an image signal component of an intermediate image signal representing an intermediate image, which image signal component represents one pixel in the intermediate image, and vi) correction processing means for performing correction processing on the intermediate image signal in order to obtain a final image signal, which represents a final image.

In the second radiation image read-out apparatus in accordance with the present invention, the correction processing should preferably contain at least one of correction processing for compensation for dark current, correction processing for compensation for sensitivity, correction processing for compensation for linearity, correction processing for compensation for shading, and logarithmic conversion processing.

Also, in the second radiation image read-out apparatus in accordance with the present invention, the correction processing means should preferably perform at least two kinds of processings, which are among the processings for the correction processing, with one time of table conversion processing.

Further, in the second radiation image read-out apparatus in accordance with the present invention, the stimulable phosphor sheet should preferably contain the stimulable phosphor (the phosphor for energy storage), which is capable of absorbing light having wavelengths falling within an ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

With the first radiation image read-out method and apparatus in accordance with the present invention, the addition processing is performed on the outputs of the n number of the pixel regions constituting the line sensor, which pixel regions are adjacent to one another along the longitudinal direction of the line sensor. In this manner, the image signal component of the final image signal representing the final image, which image signal component represents one pixel in the final image, is obtained. Therefore, each of the pixel regions constituting the line sensor may take charge of 1/n of the signal amount of the image signal component, which represents one pixel in the final image. Accordingly, the problems are capable of being prevented from occurring in that saturation is reached in electric charge amount at each of the pixel regions constituting the line sensor. As a result, the radiation image information is capable of being accurately read out from an area on the stimulable phosphor sheet, at which a high level of energy has been stored during exposure to radiation, and an image having good image quality is capable of being obtained.

Also, with the first radiation image read-out method and apparatus in accordance with the present invention, the addition processing is performed on the outputs of the pixel regions, which are adjacent to one another in the longitudinal direction of the line sensor. Immediately after the outputs of the n number of the pixel regions adjacent to one another, which outputs are to be added together, have been read, the addition processing is capable of being performed on the outputs of the pixel regions. Therefore, the outputs before being added together need not be stored in a memory, and the required memory capacity is capable of being kept small. Accordingly, the cost is capable of being kept low.

Further, with the first radiation image read-out method and apparatus in accordance with the present invention, wherein the stimulable phosphor sheet contains the phosphor for energy storage described above, the image quality of the obtained image is capable of being enhanced even further.

With the second radiation image read-out method and apparatus in accordance with the present invention, the addition processing is performed on the outputs of the plurality of the photoelectric conversion devices constituting the line sensor, which photoelectric conversion devices are adjacent to one another along the longitudinal direction of the line sensor. In this manner, the image signal component of the intermediate image signal representing the intermediate image, which image signal component represents one pixel in the intermediate image, is obtained. Thereafter, the correction processing is performed on the intermediate image signal, and the final image signal, which represents the final image, is thereby obtained. In this manner, the addition processing is performed before the correction processing is conducted. Therefore, the amount of the image signal to be subjected to the correction processing is capable of being kept small. Accordingly, a particular circuit capable of operating quickly need not be utilized as the circuit for the correction processing, and the correction processing is capable of being performed quickly. Also, the required memory capacity is capable of being kept small.

Also, with the second radiation image read-out method and apparatus in accordance with the present invention, as the correction processing, at least one of the correction processing for compensation for dark current, the correction processing for compensation for sensitivity, the correction processing for compensation for linearity, the correction processing for compensation for shading, and the logarithmic conversion processing may be performed. In such cases, the image quality of the obtained image is capable of being enhanced reliably.

Further, with the second radiation image read-out method and apparatus in accordance with the present invention, the correction processing may be performed by utilizing the table, such as the LUT, with which at least two kinds of processings (e.g., the correction processing for compensation for sensitivity and the correction processing for compensation for shading) among the processings for the correction processing are capable of being performed with one time of table conversion processing. In such cases, the calculations for the correction processing are capable of being performed quickly and easily.

DESCRIPTION OF THE PREFERRED EMBODIMENTS

The present invention will hereinbelow be described in further detail with reference to the accompanying drawings.

Figure 1:
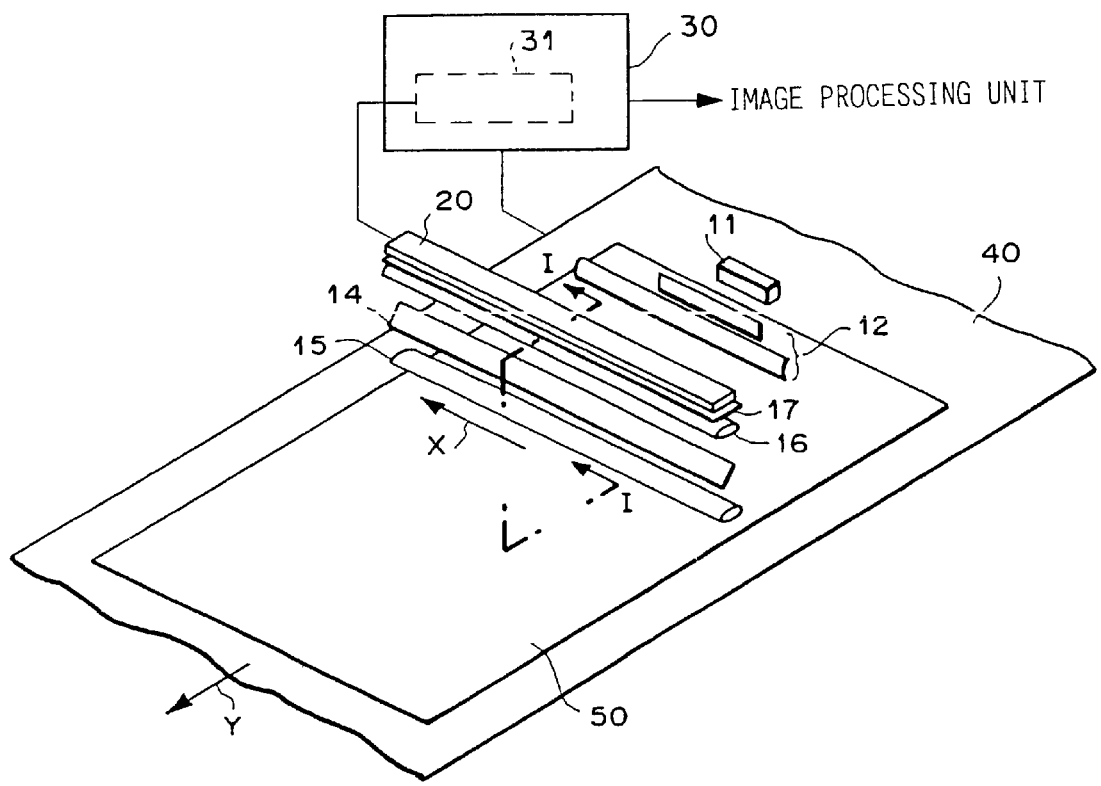
FIG. 1 is a perspective view showing a first embodiment of the radiation image read-out apparatus in accordance with the present invention.
Figure 2:
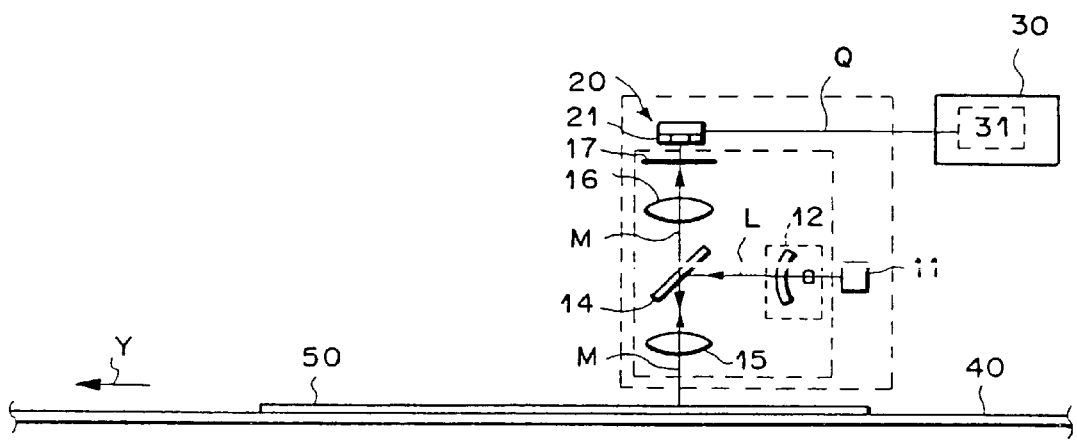
FIG. 2 is a sectional view taken on line I—I of FIG. 1.
Figure 3:
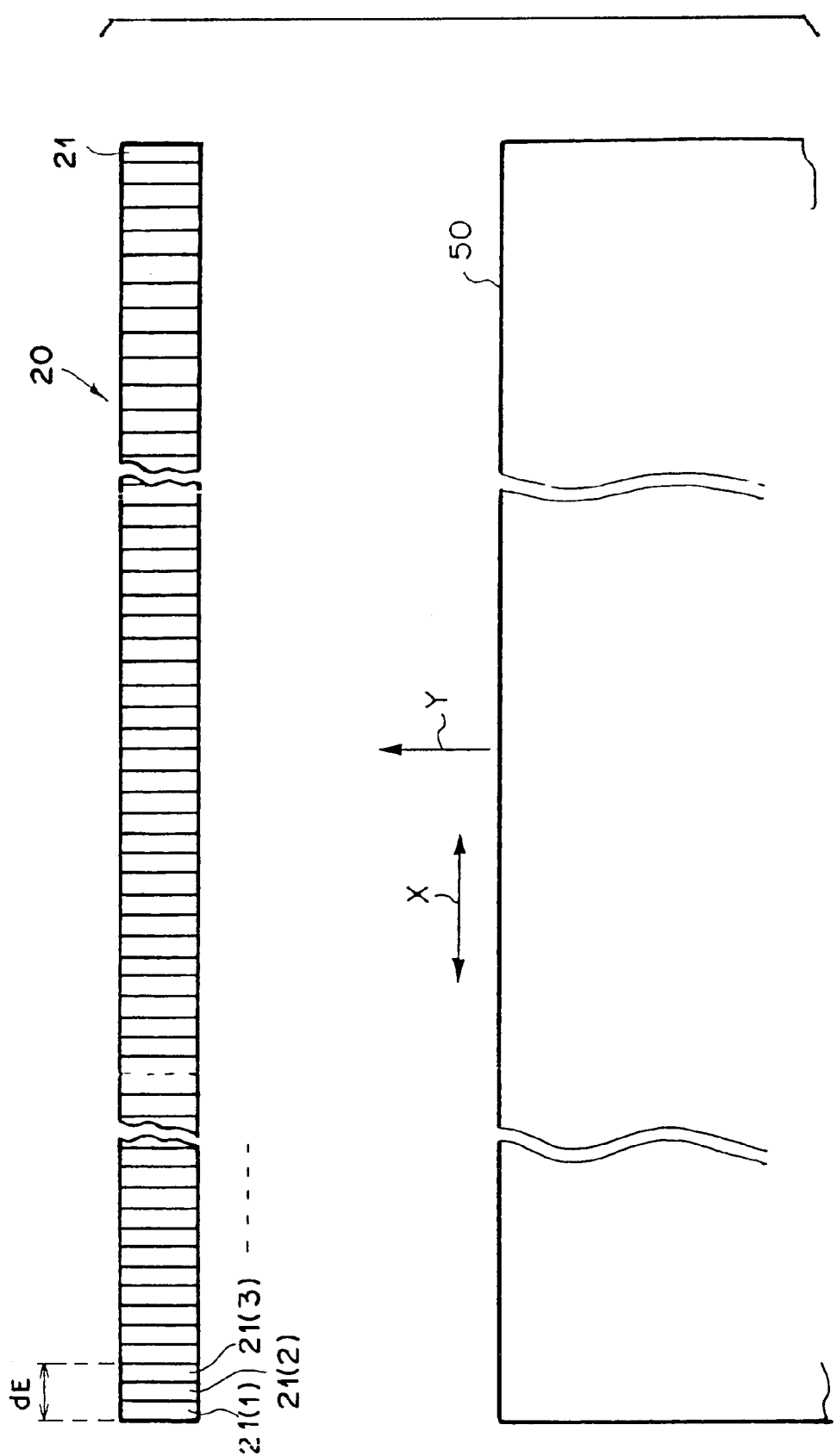
FIG. 3 is an explanatory view showing a line sensor in the embodiment of FIG. 1.

FIG. 1 is a perspective view showing a first embodiment of the radiation image read-out apparatus in accordance with the present invention. FIG. 2 is a sectional view taken on line I—I of FIG. 1. FIG. 3 is an explanatory view showing a line sensor in the embodiment of FIG. 1.

With reference to FIG. 1, the radiation image read-out apparatus comprises a scanning belt 40 for supporting a stimulable phosphor sheet (hereinbelow referred to simply as the sheet) 50, on which a radiation image has been stored. The scanning belt 40 conveys the sheet 50 in the direction indicated by the arrow Y. The radiation image read-out apparatus also comprises a broad area laser (hereinbelow referred to as the BLD) 11 for radiating out secondary stimulating rays (hereinbelow referred to simply as the stimulating rays) L having a linear pattern. The stimulating rays L are radiated out approximately in parallel with the surface of the sheet 50. The radiation image read-out apparatus further comprises an optical system 12, which is constituted of a combination of a collimator lens for collimating the linear stimulating rays L having been radiated out of the BLD 11 and a toric lens for expanding the beam only in one direction. The radiation image read-out apparatus still further comprises a dichroic mirror 14, which is located at an angle of 45 degrees with respect to the surface of the sheet 50 and which is set so as to reflect the stimulating rays L and to transmit emitted light M described later. The radiation image read-out apparatus also comprises a distributed index lens array (constituted of an array of a plurality of distributed index lenses and hereinbelow referred to as the first SELFOC lens array) 15. The first SELFOC lens array 15 converges the linear stimulating rays L, which have been reflected from the dichroic mirror 14, into a linear beam extending along the direction indicated by the arrow X on the sheet 50. Also, the first SELFOC lens array 15 collimates the light M, which is emitted by the sheet 50 exposed to the linear stimulating rays L and which carries the radiation image information having been stored on the sheet 50. The radiation image read out apparatus further comprises a second SELFOC lens array 16 for converging the emitted light M, which has been collimated by the first SELFOC lens array 15 and has then passed through the dichroic mirror 14, onto a line sensor 20, which will be described later. The radiation image read-out apparatus still further comprises a stimulating ray cut-off filter 17 for transmitting only the emitted light M and filtering out the stimulating rays L, which have been reflected from the surface of the sheet 50 and which are mixed slightly in the emitted light M having passed through the second SELFOC lens array 16. The radiation image read-out apparatus also comprises the line sensor 20 for receiving the emitted light M having passed through the stimulating ray cut-off filter 17 and for photo-electrically converting the emitted light M. The radiation image read-out apparatus further comprises image information reading means 30. The image information reading means 30 is provided with addition processing means 31 for receiving outputs of pixel regions 21, 21, . . ., which constitute the line sensor 20. With respect to every set of three pixel regions 21, 21, 21, which are adjacent to one another, the addition processing means 31 adds the outputs of the three pixel regions 21, 21, 21, which are adjacent to one another, in order to obtain an image signal component S, which represents one pixel in a final image. The image information reading means 30 performs operation processing on the image signal components S, S, . . . representing the respective pixels in the final image, which image signal components have been obtained from the addition processing means 31, such that it may be clear which image signal component S corresponds to which site on the sheet 50. An image signal, which has been obtained from the operation processing, is fed out from the image information reading means 30.

The first SELFOC lens array 15 acts such that an image of the emission area of the emitted light M on the sheet 50 is formed in one-to-one size relationship on the image surface at the dichroic mirror 14. The second SELFOC lens array 16 acts such that an image of the emitted light M on the dichroic mirror 14 is formed in one-to-one size relationship on the image surface at the light receiving surface of the line sensor 20.

The optical system 12, which is constituted of the collimator lens and the toric lens, expands the stimulating rays L, which come from the BLD 11, into a desired irradiation area on the dichroic mirror 14.

As illustrated in FIG. 3, the line sensor 20 comprises a plurality of the pixel regions 21, 21, . . . arrayed along the direction indicated by the arrow X (i.e., along the longitudinal direction of the line sensor 20). In this embodiment, the width of each of the pixel regions 21, 21, . . . constituting the line sensor 20, which width is taken in the direction indicated by the arrow X, is equal to one third of a width $d_E$ of one pixel in the final image, which width is taken in the direction indicated by the arrow X. Also, the outputs having been obtained from three pixel regions 21, 21, 21, which are adjacent to one another, are added together in order to constitute the image signal component S, which represents one pixel in the final image.

How the first embodiment of the radiation image read-out apparatus in accordance with the present invention operates will be described hereinbelow.

Firstly, the scanning belt 40 moves in the direction indicated by the arrow Y, and the sheet 50, on which the radiation image has been stored and which is supported on the scanning belt 40, is conveyed in the direction indicated by the arrow Y. The conveyance speed of the sheet 50 is equal to the movement speed of the scanning belt 40. Information representing the movement speed of the scanning belt 40 is fed into the image information reading means 30.

The BLD 11 radiates out the stimulating rays L having a linear pattern. The stimulating rays L are radiated out approximately in parallel with the surface of the sheet 50. The stimulating rays L are collimated by the optical system 12, which is constituted of the collimator lens and the toric lens and is located in the optical path of the stimulating rays L. The collimated stimulating rays L are reflected from the dichroic mirror 14 to the direction that impinges perpendicularly upon the surface of the sheet 50. The reflected stimulating rays L are converged by the first SELFOC lens array 15 into a linear beam extending along the direction indicated by the arrow X on the sheet 50.

When the sheet 50 is exposed to and stimulated by the linear stimulating rays L, the light M having an intensity in accordance with the image information stored on the sheet 50 is emitted from the area containing the exposed area and the neighboring areas. The emitted light M is collimated by the first SELFOC lens array 15, passes through the dichroic mirror 14, and is converged by the second SELFOC lens array 16 onto the pixel regions 21, 21, . . . constituting the line sensor 20. At this time, the stimulating rays L, which have been reflected from the surface of the sheet 50 and are mixed slightly in the emitted light M having passed through the second SELFOC lens array 16, are filtered out by the stimulating ray cut-off filter 17.

As illustrated in FIG. 3, the light collecting range of each of the pixel regions 21, 21, . . . constituting the line sensor 20, which light collecting range is taken in the direction indicated by the arrow X, is equal to one third of the width $d_E$ of one pixel in the final image, which width is taken in the direction indicated by the arrow X. Therefore, the intensity of the light, which each of the pixel regions 21, 21, . . . collects, is comparatively low, and the problems are capable of being prevented from occurring in that saturation is reached in electric charge amount at each of the pixel regions 21, 21, . . .

Also, in the first embodiment, as an aid in facilitating the explanation, the optical system between the sheet 50 and the line sensor 20 is set as a one-to-one image forming system. Alternatively, the optical system between the sheet 50 and the line sensor 20 may be set as a magnifying optical system or a contracting optical system. However, from the point of view of enhancing the light collecting efficiency, the optical system between the sheet 50 and the line sensor 20 should preferably be set as the equi-magnification optical system or the magnifying optical system.

The line sensor 20 photoelectrically converts the emitted light M, which has been received by each of pixel regions 21(1), 21(2), 21(3), . . . , and obtains signal components $Q_1$, $Q_2$, $Q_3$, . . . from the photoelectric conversion. The signal components $Q_1$, $Q_2$, $Q_3$, . . . are fed into the addition processing means 31.

The addition processing means 31 adds the outputs Q, Q, . . . which have been obtained from three pixel regions 21, 21, 21 adjacent to one another, in order to obtain an image signal component S, which represents one pixel in the final image. For example, the addition processing means 31 adds the outputs $Q_1$, $Q_2$, and $Q_3$, which have been obtained from the pixel regions 21(1), 21(2), and 21(3), in order to obtain an image signal component S1, which represents one pixel in the final image. Also, the addition processing means 31 adds outputs $Q_4$, $Q_5$, and $Q_6$, which have been obtained from pixel regions 21(4) 21(5), and 21(6), in order to obtain an image signal component S2, which represents one pixel in the final image. Also, in accordance with the movement speed of the scanning belt 40, the image information reading means 30 cumulates and stores the thus obtained image signal components S, S, . . . in memory regions corresponding to respective sites on the sheet 50. The image signal components S, S, . . . are thereafter fed out as the image information to an image processing unit.

As described above, with the first embodiment of the radiation image read-out apparatus in accordance with the present invention, the addition processing is performed on the outputs Q, Q, Q, which have been obtained from three pixel regions 21, 21, 21 constituting the line sensor 20, which pixel regions are adjacent to one another along the longitudinal direction of the line sensor 20, i.e. along the direction indicated by the arrow X. In this manner, the image signal component S of the final image signal representing the final image, which image signal component represents one pixel in the final image, is constituted. Therefore, each of the pixel regions 21, 21, . . . constituting the line sensor 20 may take charge of one third of the signal amount of the image signal component S, which represents one pixel in the final image. Accordingly, the problems are capable of being prevented from occurring in that saturation is reached in electric charge amount at each of the pixel regions 21, 21, . . . constituting the line sensor 20. As a result, the radiation image information is capable of being accurately read out from an area on the stimulable phosphor sheet 50, at which a high level of energy has been stored during exposure to radiation, and an image having good image quality is capable of being obtained.

Also, with the first embodiment of the radiation image read-out apparatus in accordance with the present invention, the addition processing is performed on the outputs Q, Q, Q of the three pixel regions 21, 21, 21, which are adjacent to one another in the longitudinal direction of the line sensor 20, i.e., in the direction indicated by the arrow X. Immediately after the outputs Q, Q, Q of the three pixel regions 21, 21, 21 adjacent to one another, which outputs are to be added together, have been read, the addition processing is capable of being performed on the outputs Q, Q, Q of the three pixel regions 21, 21, 21 adjacent to one another. Therefore, the outputs Q, Q, . . . before being subjected to the addition processing, which outputs correspond to all of scanning lines, need not be stored in a memory, and the required memory capacity is capable of being kept small. Accordingly, the cost is capable of being kept low.

The radiation image read-out apparatus in accordance with the present invention is not limited to the first embodiment described above and may be embodied in various other ways. For example, various known constitutions may be employed as the light source, the light guiding optical system between the light source and the sheet, the optical systems between the sheet and the line sensor, the line sensor, or the addition processing means. Also, the radiation image read-out apparatus may further comprise an image processing unit, which performs various kinds of signal processing on the image signal obtained from the image information reading means 30, and/or erasing means for appropriately releasing radiation energy remaining on the sheet from which the image signal has been detected.

Figure 4:
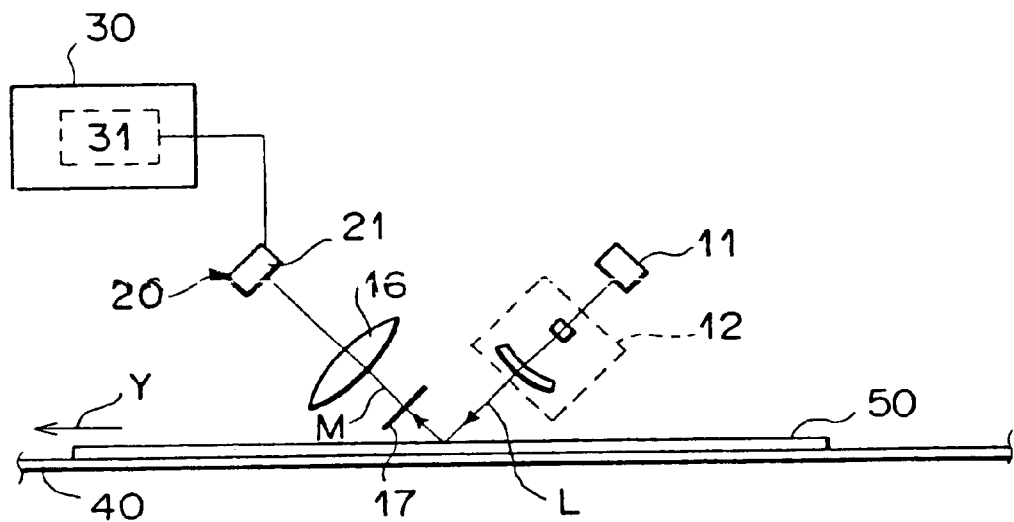
FIG. 4 is a sectional view showing a second embodiment of the radiation image read-out apparatus in accordance with the present invention.

Also, in the aforesaid first embodiment of the radiation image read-out apparatus in accordance with the present invention, part of the optical path of the stimulating rays L and part of the optical path of the emitted light M overlap each other, and the size of the apparatus is thereby reduced. Alternatively, for example, as illustrated in FIG. 4, the radiation image read-out apparatus in accordance with the present invention may be constituted such that the optical path of the stimulating rays L and the optical path of the emitted light M may not overlap each other. A second embodiment of the radiation image read-out apparatus in accordance with the present invention, which is constituted in such a manner, will be described hereinbelow.

Specifically, the radiation image read-out apparatus illustrated in FIG. 4, in which the line sensor 20 shown in FIG. 3 is utilized, comprises the scanning belt 40 and the BLD 11 for radiating out the linear stimulating rays L at an angle of approximately 45 degrees with respect to the surface of the sheet 50. The radiation image read-out apparatus also comprises the optical system 12, which is constituted of a combination of a collimator lens for collimating the linear stimulating rays L having been radiated out of the BLD 11 and a toric lens for expanding the beam only in one direction, and which causes the linear stimulating rays L to impinge upon the surface of the sheet 50. The radiation image read-out apparatus further comprises the SELFOC lens array 16 having an optical axis, which is inclined at an angle of approximately 45 degrees with respect to the surface of the sheet 50 and which is approximately normal to the direction of travel of the stimulating rays L. The SELFOC lens array 16 converges the light M, which is emitted by the sheet 50 when the sheet 50 is exposed to the stimulating rays L, onto the pixel regions 21, 21, . . . constituting the line sensor 20. The radiation image read-out apparatus still further comprises the stimulating ray cut-off filter 17 for transmitting only the emitted light M and filtering out the stimulating rays L, which are mixed slightly in the emitted light M impinging upon the SELFOC lens array 16. The radiation image read-out apparatus also comprises the line sensor 20 for receiving the emitted light M having passed through the stimulating ray cut-off filter 17 and for photoelectrically converting the emitted light M. The radiation image read-out apparatus further comprises the image information reading means 30. The image information reading means 30 is provided with the addition processing means 31 for receiving the signal components Q, Q, . . . outputted from the pixel regions 21, 21, . . . which constitute the line sensor 20. With respect to every set of the three pixel regions 21, 21, 21, which are adjacent to one another, the addition processing means 31 adds the signal components Q, Q, Q having been outputted from the three pixel regions 21, 21, 21, which are adjacent to one another, in order to obtain the image signal component S, which represents one pixel in the final image. The image information reading means 30 performs operation processing on the image signal components S, S, . . . representing the respective pixels in the final image, which image signal components have been obtained from the addition processing means 31, such that it may be clear which image signal component S corresponds to which site on the sheet 50. The image signal, which has been obtained from the operation processing, is fed out from the image information reading means 30.

The SELFOC lens array 16 acts such that an image of the emission area of the emitted light M on the sheet 50 is formed intone-to-one size relationship on the light receiving surface of the line sensor 20. The optical system 12, which is constituted of the collimator lens and the toric lens, expands the stimulating rays L, which come from the BLD 11, into a desired irradiation area on the sheet 50.

How the second embodiment of the radiation image read-out apparatus in accordance with the present invention, which is i'shown in FIG. 4, operates will be described hereinbelow.

Firstly, the scanning belt 40 moves in the direction indicated by the arrow Y, and the sheet 50, on which the radiation image has been stored and which is supported on the scanning belt 40, is conveyed in the direction indicated by the arrow Y. The conveyance speed of the sheet 50 is equal to the movement speed of the scanning belt 40. Information representing the movement speed of the scanning belt 40 is fed into the image information reading means 30.

The BLD 11 radiates out the stimulating rays L having a linear pattern. The stimulating rays L are radiated out at an angle of, approximately 45 degrees with respect to the surface of the sheet 50. The stimulating rays L are collimated by the optical system 12, which is constituted of the collimator lens and the toric lens and is located in the optical path of the stimulating rays L. The collimated stimulating rays L impinge upon the surface of the sheet 50 at an angle of approximately 45 degrees with respect to the surface of the sheet 50. At this time, the stimulating rays L impinge upon the linear area on the surface of the sheet 50, which linear area extends in the direction indicated by the arrow X.

When the sheet 50 is exposed to and stimulated by the linear stimulating rays L, the light M having an intensity in accordance with the image information stored on the sheet 50 is emitted from the area containing the exposed area and the neighboring areas. The emitted light M passes through the stimulating ray cut-off filter 17, which filters out the stimulating rays L mixed in the emitted light M. The emitted light M then impinges upon the SELFOC lens array 16 and is converged onto the pixel regions 21, 21, . . . constituting the line sensor 20.

The operations performed after the emitted light M is received by the line sensor 20 are the same as those in the aforesaid first embodiment of the radiation image read-out apparatus in accordance with the present invention.

As described above, with the second embodiment of the radiation image read-out apparatus in accordance with the present invention, the addition processing is performed on the outputs Q, Q, Q, which have been obtained from three pixel regions 21, 21, 21 constituting the line sensor 20, which pixel regions are adjacent to one another along the longitudinal direction of the line sensor 20, i.e. along the direction indicated by the arrow X. In this manner, the image signal component s of the final image signal representing the final image, which image signal component represents one pixel in the final image, is constituted. Therefore, each of the pixel regions 21, 21, . . . constituting the line sensor 20 may take charge of one third of the signal amount of the image signal component S, which represents one pixel in the final image. Accordingly, the problems are capable of being prevented from occurring in that saturation is reached in electric charge amount at each of the pixel regions 21, 21, . . . constituting the line sensor 20. As a result, the radiation image information is capable of being accurately read out from an area on the stimulable phosphor sheet 50, at which a high level of energy has been stored during exposure to radiation, and an image having good image quality is capable of being obtained.

Also, with the second embodiment of the radiation image read-out apparatus in accordance with the present invention, the addition processing is performed on the outputs Q, Q, Q of the three pixel regions 21, 21, 21, which are adjacent to one another in the longitudinal direction of the line sensor 20, i.e., in the direction indicated by the arrow X. Immediately after the outputs Q, Q, Q of the three pixel regions 21, 21, 21 adjacent to one another, which outputs are to be added together, have been read, the addition processing is capable of being performed on the outputs Q, Q, Q of the three pixel regions 21, 21, 21 adjacent to one another. Therefore, the outputs Q, Q, . . . before being subjected to the addition processing, which outputs correspond to all of scanning lines, need not be stored in a memory, and the required memory capacity is capable of being kept small. Accordingly, the cost is capable of being kept low.

Figure 5:
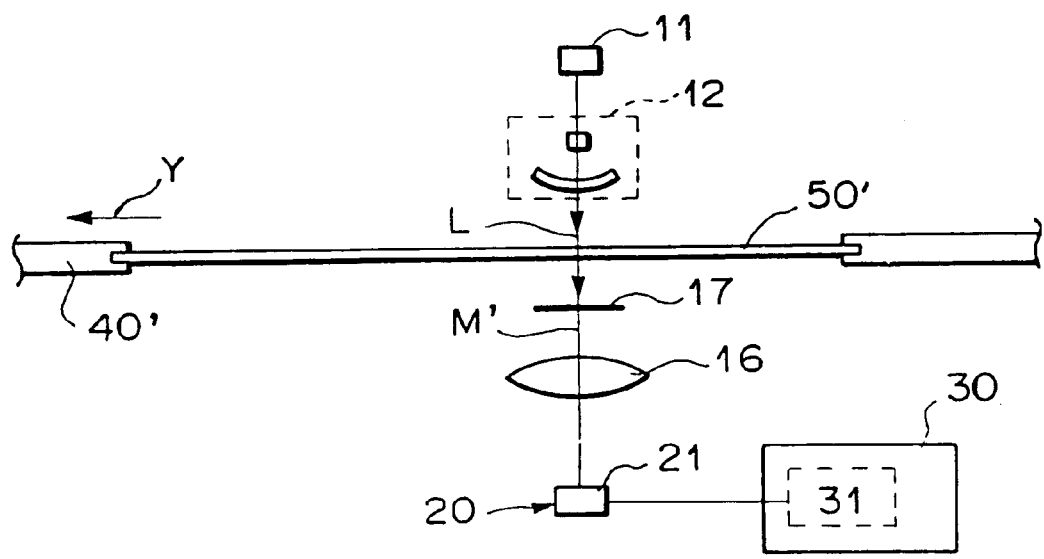
FIG. 5 is a sectional view showing a third embodiment of the radiation image read-out apparatus in accordance with the present invention.

In the aforesaid first and second embodiments of the radiation image read-out apparatus in accordance with the present invention, the BLD 11 for producing the stimulating rays L and the line sensor 20 are located on the same surface side of the sheet 50, and the emitted light M emanating from the surface of the sheet 50, upon which the stimulating rays L impinge, is received by the line sensor 20. Thus the constitutions are the reflection types of constitutions. However, the radiation image read-out apparatus in accordance with the present invention is not limited to the reflection types of constitutions. For example, as illustrated in FIG. 5, a stimulable phosphor sheet 50' whose substrate is formed from a material permeable to the emitted light M may be employed, and the BLD 11 for producing the stimulating rays L and the line sensor 20 may be located on opposite surface sides of the sheet 50'. In this manner, the emitted light M emanating from the surface opposite to the surface of the sheet 50', upon which the stimulating rays L impinge, may be received by the line sensor 20. Thus the constitution may be the transmission type of constitution. A third embodiment of the radiation image read-out apparatus in accordance with the present invention, which is constituted in such a manner, will be described hereinbelow.

Specifically, the radiation image read-out apparatus illustrated in FIG. 5 comprises a conveyor belt 40' for supporting the leading end portion and the tail end portion of the stimulable phosphor sheet 50' and conveying the sheet 50' in the direction indicated by the arrow Y. (No image information is stored at the leading end portion and the tail end portion of the sheet 50', or image information representing a region other than a region of interest in the radiation image is stored at the leading end portion and the tail end portion of the sheet 50'.) The radiation image read-out apparatus also comprises the BLD 11 for radiating out the linear stimulating rays L along the direction approximately normal to one surface of the sheet 50'. The radiation image read-out apparatus further comprises the optical system 12, which is constituted of a combination of a collimator lens for collimating the linear stimulating rays L having been radiated out of the BLD 11 and a toric lens for expanding the beam only in one direction, and which causes the linear stimulating rays L to impinge upon the one surface of the sheet 50'. The radiation image read-out apparatus still further comprises the SELFOC lens array 16 having an optical axis, which is approximately normal to the one surface of the sheet 50'. The SELFOC lens array 16 converges light M', which is emitted from the other surface of the sheet 50' when the sheet 50' is exposed to the stimulating rays L (i.e., the other surface opposite to the one surface on the stimulating ray incidence side), onto the line sensor 20. The radiation image read-out apparatus also comprises the stimulating ray cut-off filter 17 for transmitting only the emitted light M' and filtering out the stimulating rays L, which are mixed slightly in the emitted light M' impinging upon the SELFOC lens array 16. The radiation image read-out apparatus further comprises the line sensor 20 for receiving the emitted light M' having passed through the stimulating ray cut-off filter 17 and for photoelectrically converting the emitted light M'. The radiation image read-out apparatus still further comprises the image information reading means 30. The image information reading means 30 is provided with the addition processing means 31 for receiving the signal components Q, Q, . . . outputted from the pixel regions 21, 21, . . . , which constitute the line sensor 20. With respect to every set of the three pixel regions 21, 21, 21, which are adjacent to one another, the addition processing means 31 adds the signal components Q, Q, Q having been outputted from the three pixel regions 21, 21, 21, which are adjacent to one another, in order to obtain the image signal component S, which represents one pixel in the final image. The image information reading means 30 performs operation processing on the image signal components S, S, . . . representing the respective pixels in the final image, which image signal components have been obtained from the addition processing means 31, such that it may be clear which image signal component S corresponds to which site on the sheet 50'. The image signal, which has been obtained from the operation processing, is fed out from the image information reading means 30.

The SELFOC lens array 16 acts such that an image of the emission area of the emitted light M' on the other surface of the sheet 50' is formed in one-to-one size relationship on the image surface at the light receiving surface of the line sensor 20. The optical system 12, which is constituted of the collimator lens and the toric lens, expands the stimulating rays L, which come from the BLD 11, into a desired irradiation area on the sheet 50'.

How the third embodiment of the radiation image read-out apparatus in accordance with the present invention, which is shown in FIG. 5, operates will be described hereinbelow.

Firstly, the conveyor belt 40' moves in the direction indicated by the arrow Y, and the sheet 50', on which the radiation image has been stored and which is supported by the conveyor belt 40', is conveyed in the direction indicated by the arrow Y. The conveyance speed of the sheet 50' is equal to the movement speed of the conveyor belt 40'. Information representing the movement speed of the conveyor belt 40' is fed into the image information reading means 30.

The BLD 11 radiates out the stimulating rays L having a linear pattern. The stimulating rays L are radiated out in the direction approximately normal to the one surface of the sheet 50'. The stimulating rays L are collimated by the optical system 12, which is constituted of the collimator lens and the toric lens and is located in the optical path of the stimulating rays L. The collimated stimulating rays L impinge upon the one surface of the sheet 50' from the direction approximately normal to the one surface of the sheet 50'. At this time, the stimulating rays L impinge upon the linear area on the one surface of the sheet 50', which linear area extends in the direction indicated by the arrow X.

When the sheet 50' is exposed to and stimulated by the linear stimulating rays L, the light M having an intensity in accordance with the image information stored on the sheet 50' is emitted from the area containing the exposed area and the neighboring areas. At the same time, the emitted light M' having passed through the transparent substrate of the sheet 50' emanates from a linear area of the other surface of the sheet 50'.

The emitted light M', which emanates from the linear area of the other surface of the sheet 50', passes through the stimulating ray cut-off filter 17, which filters out the stimulating rays L mixed in the emitted light M'. The emitted light M' then impinges upon the SELFOC lens array 16 and is converged onto the pixel regions 21, 21, . . . constituting the line sensor 20.

The operations performed after the emitted light M' is received by the line sensor 20 are the same as those in the aforesaid first embodiment of the radiation image read-out apparatus in accordance with the present invention.

As described above, with the third embodiment of the radiation image read-out apparatus in accordance with the present invention, the addition processing is performed on the outputs Q, Q, Q, which have been obtained from three pixel regions 21, 21, 21 constituting the line sensor 20, which pixel regions are adjacent to one another along the longitudinal direction of the line sensor 20, i.e. along the direction indicated by the arrow X. In this manner, the image signal component S of the final image signal representing the final image, which image signal component represents one pixel in the final image, is constituted. Therefore, each of the pixel regions 21, 21, . . . constituting the line sensor 20 may take charge of one third of the signal amount of the image signal component S, which represents one pixel in the final image. Accordingly, the problems are capable of being prevented from occurring in that saturation is reached in electric charge amount at each of the pixel regions 21, 21, . . . constituting the line sensor 20. As a result, the radiation image information is capable of being accurately read out from an area on the stimulable phosphor sheet 50', at which a high level of energy has been stored during exposure to radiation, and an image having good image quality is capable of being obtained.

Also, with the third embodiment of the radiation image read-out apparatus in accordance with the present invention, the addition processing is performed on the outputs Q, Q, Q of the three pixel regions 21, 21, 21, which are adjacent to one another in the longitudinal direction of the line sensor

20, i.e., in the direction indicated by the arrow X. Immediately after the outputs Q, Q, Q of the three pixel regions 21, 21, 21 adjacent to one another, which outputs are to be added together, have been read, the addition processing is capable of being performed on the outputs Q, Q, Q of the three pixel regions 21, 21, 21 adjacent to one another. Therefore, the outputs Q, Q, . . . before being subjected to the addition processing, which outputs correspond to all of scanning lines, need not be stored in a memory, and the required memory capacity is capable of being kept small. Accordingly, the cost is capable of being kept low.

In the aforesaid first, second, and third embodiments of the radiation image read-out apparatus in accordance with the present invention, the stimulable phosphor sheet for storing the radiation image may be an ordinary stimulable phosphor sheet comprising a stimulable phosphor for absorbing radiation and storing energy from the radiation, i.e. the radiation image. However in the radiation image read-out apparatus in accordance with the present invention, the stimulable phosphor sheet should preferably contain the phosphor for energy storage described above. In such cases, the image quality of the obtained image is capable of being enhanced even further.

Further, in the aforesaid first, second, and third embodiments of the radiation image read-out apparatus in accordance with the present invention, by way of example, the width of each of the pixel regions 21, 21, . . . constituting the line sensor 20, which width is taken in the longitudinal direction of the line sensor 20, is set to be equal to one third of the width of the one pixel in the final image, the width of the one pixel in the final image being taken in the longitudinal direction of the line sensor 20. Alternatively, in the radiation image read-out apparatus in accordance with the present invention, in accordance with the level of energy having been stored on the sheet 50, the width of each of the pixel regions 21, 21, . . . constituting the line sensor 20, which width is taken in the longitudinal direction of the line sensor 20, may be set to be equal to 1/n of the width of the one pixel in the final image, where n represents an integral number of at least 2 and other than 3, the width of the one pixel in the final image being taken in the longitudinal direction of the line sensor 20.

Furthermore, the stimulable phosphor sheet employed in the first, second, and third embodiments of the radiation image read-out apparatus in accordance with the present invention may be a stimulable phosphor sheet for energy subtraction processing, which stores two radiation images of a single object formed with radiation having different energy distributions, the stimulable phosphor sheet being capable of emitting light, which carries information of one of the two radiation images, from one surface, and emitting light, which carries information of the other radiation image, from the other surface. Also, two line sensors may be utilized, each of which is located on one of the opposite surface sides of the stimulable phosphor sheet, the two line sensors detecting two image signals, each of which is made up of a series of image signal components representing pixels in the radiation image, from the opposite surfaces of the stimulable phosphor sheet. Further, the apparatus may be provided with reading means for performing a subtraction process on image signal components of the two image signals, which image signal components represent corresponding pixels on the opposite surfaces of the stimulable phosphor sheet. In such cases, as each of the two line sensors located on opposite surface sides of the stimulable phosphor sheet, a line sensor may be utilized, wherein the width of each of the pixel regions constituting the line sensor, which width is taken in the longitudinal direction of the line sensor, is equal to 1/n of the width of the one pixel in the final image, where n represents an integral number of at least 2, the width of the one pixel in the final image being taken in the longitudinal direction of the line sensor. Also, the reading means may be provided with the addition processing means for performing the addition processing on the outputs of the n number of pixel regions constituting the line sensor, which pixel regions are adjacent to one another along the longitudinal direction of the line sensor, in order to obtain the image signal component of the final image signal representing the final image, which image signal component represents one pixel in the final image.

As the stimulable phosphor sheet for energy subtraction processing, it is possible to employ an anisotropic stimulable phosphor sheet, such as a stimulable phosphor sheet, wherein the light emission region of the stimulable phosphor sheet is partitioned by a stimulating ray reflecting partition member, which extends in the thickness direction of the stimulable phosphor sheet, into a plurality of fine cells.

Figure 6:
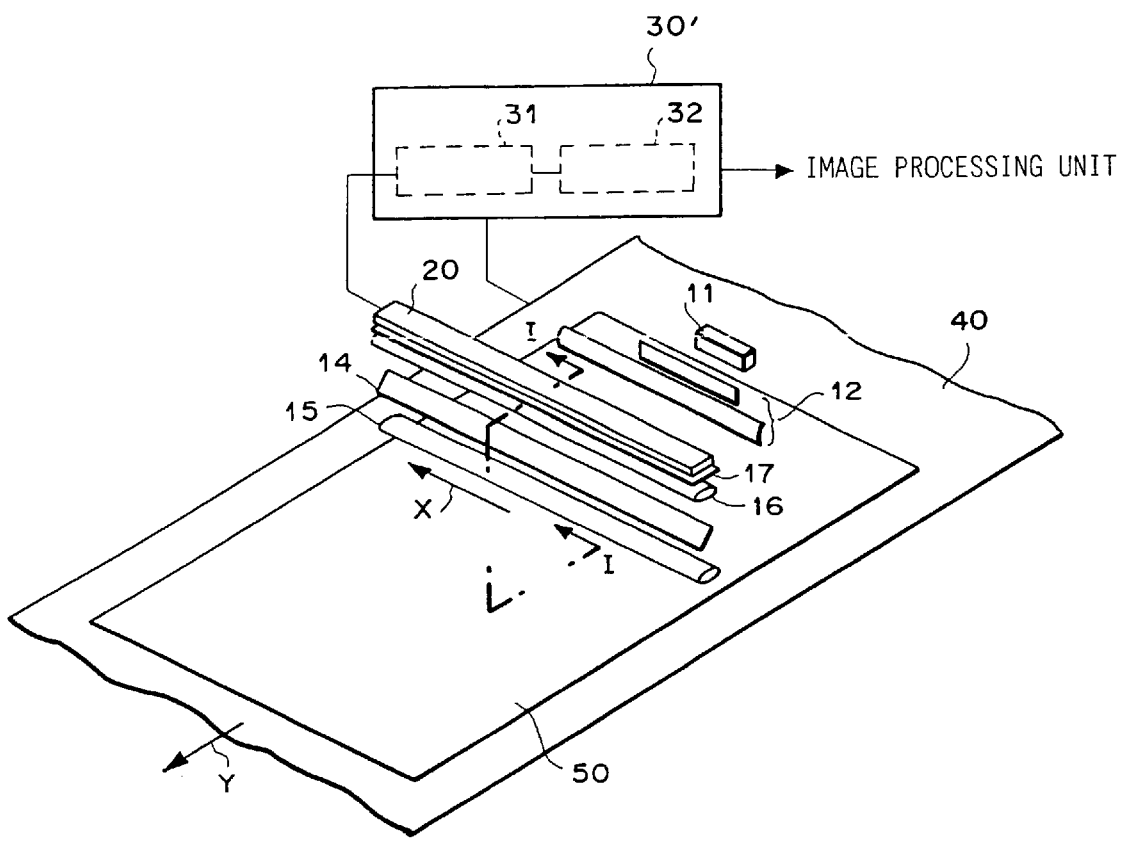
FIG. 6 is a perspective view showing a fourth embodiment of the radiation image read-out apparatus in accordance with the present invention.
Figure 7:
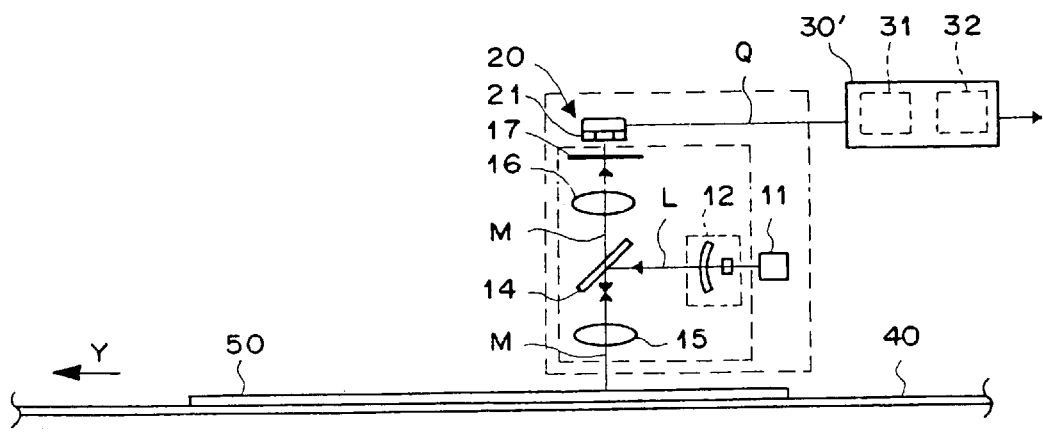
FIG. 7 is a sectional view taken on line I—I of FIG. 6.

FIG. 6 is a perspective view showing a fourth embodiment of the radiation image read-out apparatus in accordance with the present invention. FIG. 7 is a sectional view taken on line I—I of FIG. 6.

With reference to FIG. 6, the radiation image read-out apparatus comprises the scanning belt 40 for supporting the stimulable phosphor sheet (hereinbelow referred to simply as the sheet) 50, on which a radiation image has been stored. The scanning belt 40 conveys the sheet 50 in the direction indicated by the arrow Y. The radiation image read-out apparatus also comprises the broad area laser (hereinbelow referred to as the BLD) 11 for radiating out the secondary stimulating rays (hereinbelow referred to simply as the stimulating rays) L having a linear pattern. The stimulating rays L are radiated out approximately in parallel with the surface of the sheet 50. The radiation image read-out apparatus further comprises the optical system 12, which is constituted of a combination of a collimator lens for collimating the linear stimulating rays L having been radiated out of the BLD 11 and a toric lens for expanding the beam only in one direction. The radiation image read-out apparatus still further comprises the dichroic mirror 14, which is located at an angle of 45 degrees with respect to the surface of the sheet 50 and which is set so as to reflect the stimulating rays L and to transmit emitted light M described later. The radiation image read-out apparatus also comprises the distributed index lens array (constituted of an array of a plurality of distributed index lenses and hereinbelow referred to as the first SELFOC lens array) 15. The first SELFOC lens array 15 converges the linear stimulating rays L, which have been reflected from the dichroic mirror 14, into a linear beam extending along the direction indicated by the arrow X on the sheet 50. Also, the first SELFOC lens array 15 collimates the light M, which is emitted by the sheet 50 exposed to the linear stimulating rays L and which carries the radiation image information having been stored on the sheet 50. The radiation image read-out apparatus further comprises the second SELFOC lens array 16 for converging the emitted light M, which has been collimated by the first SELFOC lens array 15 and has then passed through the dichroic mirror 14, onto the line sensor 20. The radiation image read-out apparatus still further comprises the stimulating ray cut-off filter 17 for transmitting only the emitted light M and filtering out the stimulating rays L, which have been reflected from the surface of the sheet 50 and which are mixed slightly in the emitted light M having passed through the second SELFOC lens array 16. The radiation image read-out apparatus also comprises the line sensor 20 for receiving the emitted light M having passed through the stimulating ray cut-off filter 17 and for photoelectrically converting the emitted light M. The radiation image read-out apparatus further comprises image information reading means 30'. The image information reading means 30' is provided with the addition processing means 31 for receiving outputs of photoelectric conversion devices (pixel regions) 21, 21, . . . , which constitute the line sensor 20. With respect to every set of three photoelectric conversion devices 21, 21, 21, which are adjacent to one another, the addition processing means 31 adds the outputs of the three photoelectric conversion devices 21, 21, 21, which are adjacent to one another, in order to obtain an image signal component of an intermediate image signal representing an intermediate image, which image signal component represents one pixel in the intermediate image. The image information reading means 30' is also provided with correction processing means 32 for performing correction processing on the intermediate image signal, which has been obtained from the addition processing means 31, in order to obtain a final image signal representing a final image. The image information reading means 30' performs operation processing on image signal components S, S, . . . of the final image signal, which represent the respective pixels in the final image and which have been obtained from the correction processing means 32, such that it may be clear which image signal component S corresponds to which site on the sheet 50. An image signal, which has been obtained from the operation processing, is fed out from the image information reading means 30'.

The first SELFOC lens array 15 acts such that an image of the emission area of the emitted light M on the sheet 50 is formed in one-to-one size relationship on the image surface at the dichroic mirror 14. The second SELFOC lens array 16 acts such that an image of the emitted light M on the dichroic mirror 14 is formed in one-to-one size relationship on the image surface at the light receiving surface of the line sensor 20.

The optical system 12, which is constituted of the collimator lens and the toric lens, expands the stimulating rays L, which come from the BLD 11, into a desired irradiation area on the dichroic mirror 14.

As illustrated in FIG. 3, the line sensor 20 comprises a plurality of the photoelectric conversion devices 21, 21, . . . arrayed along the direction indicated by the arrow X (i.e., along the longitudinal direction of the line sensor 20). In the fourth embodiment, the width of each of the photoelectric conversion devices 21, 21, . . . constituting the line sensor 20, which width is taken in the direction indicated by the arrow X, is equal to one third of the width $d_E$ of one pixel in the intermediate image or the final image, which width is taken in the direction indicated by the arrow X. Also, the outputs having been obtained from three photoelectric conversion devices 21, 21, 21, which are adjacent to one another, are added,together in order to constitute the image signal component, which represents one pixel in the intermediate image.

How the fourth embodiment of the radiation image read-out apparatus in accordance with the present invention operates will be described hereinbelow.

Firstly, the scanning belt 40 moves in the direction indicated by the arrow Y, and the sheet 50, on which the radiation image has been stored and which is supported on the scanning belt 40, is conveyed in the direction indicated by the arrow Y. The conveyance speed of the sheet 50 is equal to the movement speed of the scanning belt 40. Information representing the movement speed of the scanning belt 40 is fed into the image information reading means 30'.

The BLD 11 radiates out the stimulating rays L having a linear pattern. The stimulating rays L are radiated out approximately in parallel with the surface of the sheet 50. The stimulating rays L are collimated by the optical system 12, which is constituted of the collimator lens and the toric lens and is located in the optical path of the stimulating rays L. The collimated stimulating rays L are reflected from the dichroic mirror 14 to the direction that impinges perpendicularly upon the surface of the sheet 50. The reflected stimulating rays L are converged by the first SELFOC lens array 15 into a linear beam extending along the direction indicated by the arrow X on the sheet 50.

When the sheet 50 is exposed to and stimulated by the linear stimulating rays L, the light M having an intensity in accordance with the image information stored on the sheet 50 is emitted from the area containing the exposed area and the neighboring areas. The emitted light M is collimated by the first SELFOC lens array 15, passes through the dichroic mirror 14, and is converged by the second SELFOC lens array 16 onto the photoelectric conversion devices 21, 21, . . . constituting the line sensor 20. At this time, the stimulating rays L, which have been reflected from the surface of the sheet 50 and are mixed slightly in the emitted light M having passed through the second SELFOC lens array 16, are filtered out by the stimulating ray cut-off filter 17.

In the fourth embodiment, as an aid in facilitating the explanation, the optical system between the sheet 50 and the line sensor 20 is set as a one-to-one image forming system. Alternatively, the optical system between the sheet 50 and the line sensor 20 may be set as a magnifying optical system or a contracting optical system. However, from the point of view of enhancing the light collecting efficiency, the optical system between the sheet 50 and the line sensor 20 should preferably be set as the equi-magnification optical system or the magnifying optical system.

Also, in the fourth embodiment, as illustrated in FIG. 3, the light collecting range of each of the photoelectric conversion devices 21, 21, . . . constituting the line sensor 20, which light collecting range is taken in the direction indicated by the arrow X, is equal to one third of the width $d_E$ of one pixel in the intermediate image and the final image, which width is taken in the direction indicated by the arrow X. Therefore, the intensity of the light, which each of the photoelectric conversion devices 21, 21, . . . collects, is comparatively low, and the problems are capable of being prevented from occurring in that saturation is reached in electric charge amount at each of the photoelectric conversion devices 21, 21, . . .

The line sensor 20 photoelectrically converts the emitted light M, which has been received by each of photoelectric conversion devices 21(1), 21(2), 21(3), . . . , and obtains the signal components $Q_1, Q_2, Q_3, \ldots$ from the photoelectric conversion. The signal components $Q_1, Q_2, Q_3, \ldots$ are fed into the addition processing means 31.

The addition processing means 31 adds the outputs Q, Q, . . . , which have been obtained from three photoelectric conversion devices 21, 21, 21 adjacent to one another, in order to obtain an image signal component S', which represents one pixel in the intermediate image. For example, the addition processing means 31 adds the outputs $Q_1, Q_2$, and $Q_3$, which have been obtained from the photoelectric conversion devices 21(1) 21(2), and 21(3), in order to obtain an image signal component S1', which represents one pixel in the intermediate image. Also, the addition processing means 31 adds outputs $Q_4$, $Q_5$, and $Q_6$, which have been obtained from photoelectric conversion devices 21(4), 21(5), and 21(6), in order to obtain an image signal component S2', which represents one pixel in the intermediate image.

The correction processing means 32 is provided with a look-up table (LUT) for correction processing for compensation for dark current, correction processing for compensation for sensitivity in which variation in sensitivity among the photoelectric conversion devices 21, 21, . . . is compensated for, correction processing for compensation for linearity, and correction processing for compensation for shading. The correction processing means 32 performs the correction processing on the image signal components S1', S2', . . . of the intermediate image signal representing the intermediate image, which have been obtained from the addition processing means 31, by utilizing the LUT. Thereafter, the correction processing means 32 performs logarithmic conversion processing on the image signal components, which have been obtained from the correction processing, in order to obtain the image signal components S, S, . . . of the final image signal, which represent the respective pixels in the final image.

In accordance with the movement speed of the scanning belt 40, the image information reading means 30' cumulates and stores the thus obtained image signal components S, S, . . . in memory regions corresponding to respective sites on the sheet 50. The image signal components S, S, . . . are thereafter fed out as the image information to the image processing unit.

As described above, with the fourth embodiment of the radiation image read-out apparatus in accordance with the present invention, the addition processing is performed on the outputs Q, Q, Q, which have been obtained from the three photoelectric conversion devices 21, 21, 21 constituting the line sensor 20, which photoelectric conversion devices are adjacent to one another along the longitudinal direction of the line sensor 20, i.e. along the direction indicated by the arrow X. In this manner, the image signal component S' of the intermediate image signal representing the intermediate image, which image signal component represents one pixel in the intermediate image, is constituted. Also, the correction processing is performed on the image signal component S' of the intermediate image signal in order to obtain the image signal component S of the final image signal representing the final image, which image signal component represents one pixel in the final image. Thus the addition processing is performed before the correction processing is conducted. Therefore, the amount of the intermediate image signal to be subjected to the correction processing in the correction processing means 32 becomes one third of the amount of the initial image signal, which is obtained from the photoelectric conversion devices 21, 21, . . . Accordingly, a particular circuit capable of operating quickly need not be utilized as the circuit for the correction processing, and the correction processing is capable of being performed quickly. Also, the required memory capacity is capable of being kept small.

Further, with the fourth embodiment of the radiation image read-out apparatus in accordance with the present invention, the correction processing is performed by utilizing the LUT for the correction processing for compensation for dark current, the correction processing for compensation for sensitivity, the correction processing for compensation for linearity and the correction processing for compensation for shading. Therefore, the calculations for the correction processing are capable of being performed quickly and easily.

The radiation image read-out apparatus in accordance with the present invention is not limited to the fourth embodiment described above and may be embodied in various other ways. For example, various known constitutions may be employed as the light source, the light guiding optical system between the light source and the sheet, the optical systems between the sheet and the line sensor, the line sensor, the addition processing means, or the correction processing means. Also, the radiation image read-out apparatus may further comprise an image processing unit, which performs various kinds of signal processing on the image signal obtained from the image information reading means 30', and/or erasing means for appropriately releasing radiation energy remaining on the sheet from which the image signal has been detected.

Figure 8:
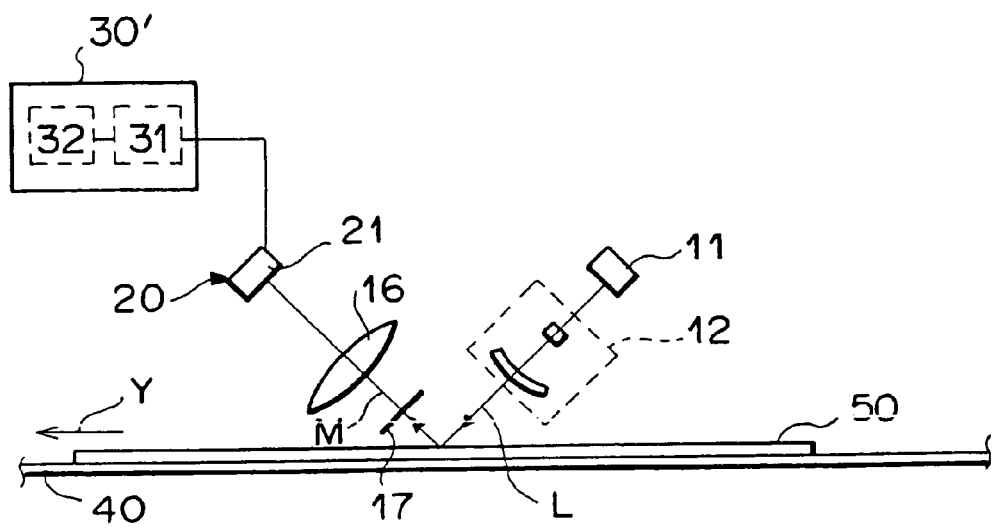
FIG. 8 is a sectional view showing a fifth embodiment of the radiation image read-out apparatus in accordance with the present invention.

Also, in the aforesaid fourth embodiment of the radiation image read-out apparatus in accordance with the present invention, part of the optical path of the stimulating rays L and part of the optical path of the emitted light M overlap each other, and the size of the apparatus is thereby reduced. Alternatively, for example, as illustrated in FIG. 8, the radiation image read-out apparatus in accordance with the present invention may be constituted such that the optical path of the stimulating rays L and the optical path of the emitted light M may not overlap each other. A fifth embodiment of the radiation image read-out apparatus in accordance with the present invention, which is constituted in such a manner, will be described hereinbelow.

Specifically, the radiation image read-out apparatus illustrated in FIG. 8, in which the line sensor 20 shown in FIG. 3 is utilized, comprises the scanning belt 40 and the BLD 11 for radiating out the linear stimulating rays L at an angle of approximately 45 degrees with respect to the surface of the sheet 50. The radiation image read-out apparatus also comprises the optical system 12, which is constituted of a combination of a collimator lens for collimating the linear stimulating rays L having been radiated out of the BLD 11 and a toric lens for expanding the beam only in one direction, and which causes the linear stimulating rays L to impinge upon the surface of the sheet 50. The radiation image read-out apparatus further comprises the SELFOC lens array 16 having an optical axis, which is inclined at an angle of approximately 45 degrees with respect to the surface of the sheet 50 and which is approximately normal to the direction of travel of the stimulating rays L. The SELFOC lens array 16 converges the light M, which is emitted by the sheet 50 when the sheet 50 is exposed to the stimulating rays L, onto the photoelectric conversion devices 21, 21, . . . constituting the line sensor 20. The radiation image read-out apparatus still further comprises the stimulating ray cut-off filter 17 for transmitting only the emitted light M and filtering out the stimulating rays L, which are mixed slightly in the emitted light M impinging upon the SELFOC lens array 16. The radiation image read-out apparatus also comprises the line sensor 20 for receiving the emitted light M having passed through the stimulating ray cut-off filter 17 and for photoelectrically converting the emitted light M. The radiation image read-out apparatus further comprises the image information reading means 301. The image information reading means 30' is provided with the addition processing means 31 for receiving the signal components Q, Q, . . . outputted from the photoelectric conversion devices 21, 21, . . . , which constitute the line sensor 20. With respect to every set of the three photoelectric conversion devices 21, 21, 21, which are adjacent to one another, the addition processing means 31 adds the signal components Q, Q, Q having been outputted from the three photoelectric conversion devices 21, 21, 21, which are adjacent to one another, in order to obtain the image signal component of the intermediate image signal representing the intermediate image, which image signal component represents one pixel in the intermediate image. The image information reading means 30' is also provided with the correction processing means 32 for performing the correction processing on the intermediate image signal, which has been obtained from the addition processing means 31, in order to obtain the final image signal representing the final image. The image information reading means 30' performs the operation processing on the image signal components S, S, . . . of the final image signal, which represent the respective pixels in the final image and which have been obtained from the correction processing means 32, such that it may be clear which image signal component S corresponds to which site on the sheet 50. An image signal, which has been obtained from the operation processing, is fed out from the image information reading means 30'.

The SELFOC lens array 16 acts such that an image of the emission area of the emitted light M on the sheet 50 is formed in one-to-one size relationship on the light receiving surface of the line sensor 20. The optical system 12, which is constituted of the collimator lens and the toric lens, expands the stimulating rays L, which come from the BLD 11, into a desired irradiation area on the sheet 50.

How the fifth embodiment of the radiation image read-out apparatus in accordance with the present invention, which is shown in FIG. 8, operates will be described hereinbelow.

Firstly, the scanning belt 40 moves in the direction indicated by the arrow Y, and the sheet 50, on which the radiation image has been stored and which is supported on the scanning belt 40, is conveyed in the direction indicated by the arrow Y. The conveyance speed of the sheet 50 is equal to the movement speed of the scanning belt 40. Information representing the movement speed of the scanning belt 40 is fed into the image information reading means 30'.

The BLD 11 radiates out the stimulating rays L having a linear pattern. The stimulating rays L are radiated out at an angle of approximately 45 degrees with respect to the surface of the sheet 50. The stimulating rays L are collimated by the optical system 12, which is constituted of the collimator lens and the toric lens and is located in the optical path of the stimulating rays L. The collimated stimulating rays L impinge upon the surface of the sheet 50 at an angle of approximately 45 degrees with respect to the surface of the sheet 50. At this time, the stimulating rays L impinge upon the linear area on the surface of the sheet 50, which linear area extends in the direction indicated by the arrow X.

When the sheet 50 is exposed to and stimulated by the linear stimulating rays L, the light M having an intensity in accordance with the image information stored on the sheet 50 is emitted from the area containing the exposed area and the neighboring areas. The emitted light M passes through the stimulating ray cut-off filter 17, which filters out the stimulating rays L mixed in the emitted light M. The emitted light M then impinges upon the SELFOC lens array 16 and is converged onto the photoelectric conversion devices 21, 21, . . . constituting the line sensor 20.

The operations performed after the emitted light M is received by the line sensor 20 are the same as those in the aforesaid fourth embodiment of the radiation image read-out apparatus in accordance with the present invention.

As described above, with the fifth embodiment of the radiation image read-out apparatus in accordance with the present invention, the same effects as those with the fourth embodiment of FIG. 6 are capable of being obtained.

Figure 9:
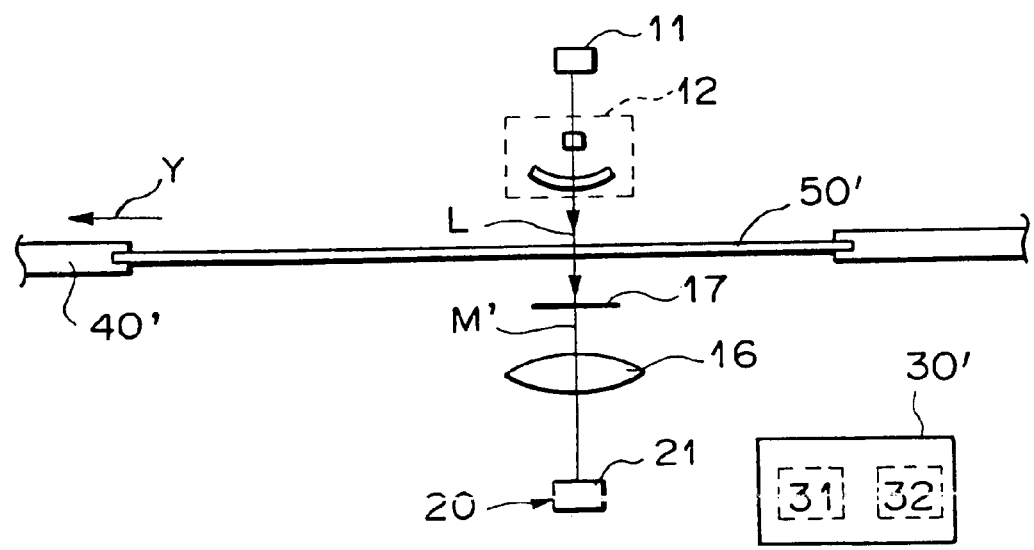
FIG. 9 is a sectional view showing a sixth embodiment of the radiation image read-out apparatus in accordance with the present invention.

In the aforesaid fourth and fifth embodiments of the radiation image read-out apparatus in accordance with the present invention, the BLD 11 for producing the stimulating rays L and the line sensor 20 are located on the same surface side of the sheet 50, and the emitted light M emanating from the surface of the sheet 50, upon which the stimulating rays L impinge, is received by the line sensor 20. Thus the constitutions are the reflection types of constitutions. However, the radiation image read-out apparatus in accordance with the present invention is not limited to the reflection types of constitutions. For example, as illustrated in FIG. 9, the stimulable phosphor sheet 50' whose substrate is formed from a material permeable to the emitted light M may be employed, and the BLD 11 for producing the stimulating rays L and the line sensor 20 may be located on opposite surface sides of the sheet 50'. In this manner, the emitted light M emanating from the surface opposite to the surface of the sheet 50', upon which the stimulating rays L impinge, may be received by the line sensor 20. Thus the constitution may be the transmission type of constitution. A sixth embodiment of the radiation image read-out apparatus in accordance with the present invention, which is constituted in such a manner, will be described hereinbelow.

Specifically, the radiation image read-out apparatus illustrated in FIG. 9 comprises the conveyor belt 40' for supporting the leading end portion and the tail end portion of the stimulable phosphor sheet 50' and conveying the sheet 50' in the direction indicated by the arrow Y. (No image information is stored at the leading end portion and the tail end portion of the sheet 50', or image information representing a region other than a region of interest in the radiation image is stored at the leading end portion and the tail end portion of the sheet 50'.) The radiation image read-out apparatus also comprises the BLD 11 for radiating out the linear stimulating rays L along the direction approximately normal to one surface of the sheet 50'. The radiation image read-out apparatus further comprises the optical system 12, which is constituted of a combination of a collimator lens for collimating the linear stimulating rays L having been radiated out of the BLD 11 and a toric lens for expanding the beam only in one direction, and which causes the linear stimulating rays L to impinge upon the one surface of the sheet 50'. The radiation image read-out apparatus still further comprises the SELFOC lens array 16 having an optical axis, which is approximately normal to the one surface of the sheet 50'. The SELFOC lens array 16 converges light M', which is emitted from the other surface of the sheet 50' when the sheet 50' is exposed to the stimulating rays L (i.e., the other surface opposite to the one surface on the stimulating ray incidence side), onto the line sensor 20. The radiation image read out apparatus also comprises the stimulating ray cut-off filter 17 for transmitting only the emitted light M' and filtering out the stimulating rays L, which are mixed slightly in the emitted light M' impinging upon the SELFOC lens array 16. The radiation image read-out apparatus further comprises the line sensor 20 for receiving the emitted light M' having passed through the stimulating ray cut-off filter 17 and for photoelectrically converting the emitted light M'. The radiation image read-out apparatus still further comprises the image information reading means 30'. The image information reading means 30' is provided with the addition processing means 31 for receiving the signal components Q, Q, . . . outputted from the photoelectric conversion devices 21, 21, . . . which constitute the line sensor 20. With respect to every set of the three photoelectric conversion devices 21, 21, 21, which are adjacent to one another, the addition processing means 31 adds the signal components Q, Q, Q having been outputted from the three photoelectric conversion devices 21, 21, 21, which are adjacent to one another, in order to obtain the image signal component of the intermediate image signal representing the intermediate image, which image signal component represents one pixel in the intermediate image. The image information reading means 30' is also provided with the correction processing means 32 for performing the correction processing on the intermediate image signal, which has been obtained from the addition processing means 31, in order to obtain the final image signal representing the final image. The image information reading means 30' performs the operation processing on the image signal components S, S, . . . of the final image signal, which represent the respective pixels in the final image and which have been obtained from the correction processing means 32, such that it may be clear which image signal component S corresponds to which site on the sheet 50'. An image signal, which has been obtained from the operation processing, is fed out from the image information reading means 30'.

The SELFOC lens array 16 acts such that an image of the emission area of the emitted light M' on the other surface of the sheet 50' is formed in one-to-one size relationship on the image' surface at the light receiving surface of the line sensor 20. The optical system 12, which is constituted of the collimator lens and the toric lens, expands the stimulating rays L, which come from the BLD 11, into a desired irradiation area on the sheet 50'.

How the sixth embodiment of the radiation image read-out apparatus in accordance with the present invention, which is shown in FIG. 9, operates will be described hereinbelow.

Firstly, the conveyor belt 40' moves in the direction indicated by the arrow Y, and the sheet 50', on which the radiation image has been stored and which is supported by the conveyor belt 40', is conveyed in the direction indicated by the arrow Y. The conveyance speed of the sheet 50' is equal to the movement speed of the conveyor belt 40'. Information representing the movement speed of the conveyor belt 40' is fed into the image information reading means 30'.

The BLD 11 radiates out the stimulating rays L having a linear pattern. The stimulating rays L are radiated out in the direction approximately normal to the one surface of the sheet 50'. The stimulating rays L are collimated by the optical system 12, which is constituted of the collimator lens and the toric lens and is located in the optical path of the stimulating rays L. The collimated stimulating rays L impinge upon the one surface of the sheet 50' from the direction approximately normal to the one surface of the sheet 50'. At this time, the stimulating rays L impinge upon the linear area on the one surface of the sheet 50', which linear area extends in the direction indicated by the arrow X.

When the sheet 50' is exposed to and stimulated by the linear stimulating rays L, the light M having an intensity in accordance with the image information stored on the sheet 50' is emitted from the area containing the exposed area and the neighboring areas. At the same time, the emitted light M' having passed through the transparent substrate of the sheet 50' emanates from a linear area of the other surface of the sheet 50'.

The emitted light M', which emanates from the linear area of the other surface of the sheet 50', passes through the stimulating ray cut-off filter 17, which filters out the stimulating rays L mixed in the emitted light M'. The emitted light M' then impinges upon the SELFOC lens array 16 and is converged onto the photoelectric conversion devices 21, 21, . . . constituting the line sensor 20.

The operations performed after the emitted light M' is received by the line sensor 20 are the same as those in the aforesaid fourth embodiment of the radiation image read-out apparatus in accordance with the present invention.

As described above, with the sixth embodiment of the radiation image read-out apparatus in accordance with the present invention, as in the fourth embodiment of FIG. 6 and the fifth embodiment of FIG. 8, the addition processing is performed before the correction processing is conducted. Therefore, the amount of the image signal to be subjected to the correction processing is capable of being kept comparatively small. Accordingly, the correction processing is capable of being performed quickly, and the required memory capacity is capable of being kept small.

In the fourth, fifth, and sixth embodiments described above, the, addition processing means 31 adds the outputs of the three photoelectric conversion devices 21, 21, 21, which are adjacent to one another, in order to obtain one image signal component S' of the intermediate image signal to be subjected to the correction processing. However, the number of the adjacent photoelectric conversion devices 21, 21, . . . , whose outputs are to be added together in order to constitute one image signal component S' of the intermediate image signal, need not necessarily be three and may be determined inaccordance with apparatus conditions and the necessity.

In the aforesaid fourth, fifth, and sixth embodiments of the radiation image read-out apparatus in accordance with the present invention, the stimulable phosphor sheet for storing the radiation image may be an ordinary stimulable phosphor sheet comprising a stimulable phosphor for absorbing radiation and storing energy from the radiation, i.e. the radiation image. However, in the radiation image read-out apparatus in accordance with the present invention, the stimulable phosphor sheet should preferably contain the phosphor for energy storage described above. In such cases, the image quality of the obtained image is capable of being enhanced even further.

Further, the stimulable phosphor sheet employed in the fourth, fifth, and sixth embodiments of the radiation image read-out apparatus in accordance with the present invention may be a stimulable phosphor sheet for energy subtraction processing, which stores two radiation images of a single object formed with radiation having different energy distributions, the stimulable phosphor sheet being capable of emitting light, which carries information of one of the two radiation images, from one surface, and emitting light, which carries information of the other radiation image, from the other surface. Also, two line sensors may be utilized, each of which is located on one of the opposite surface sides of the stimulable phosphor sheet, the two line sensors detecting two image signals, each of which is made up of a series of image signal components representing pixels in the radiation image, from the opposite surfaces of the stimulable phosphor sheet. Further, the apparatus may be provided with reading means for performing a subtraction process on image signal components of the two image signals, which image signal components represent corresponding pixels on the opposite surfaces of the stimulable phosphor sheet. In such cases, as each of the two line sensors located on opposite surface sides of the stimulable phosphor sheet, a line sensor may be utilized, wherein the width of each of the photoelectric conversion devices constituting the line sensor, which width is taken in the longitudinal direction of the line sensor, is equal to 1/n of the width of the one pixel in the final image, where n represents an integral number of at least 2, the width of the one pixel in the final image being taken in the longitudinal direction of the line sensor. Also, the reading means may be provided with the addition processing means for performing the addition processing on the outputs of the n number of photoelectric conversion devices constituting the line sensor, which photoelectric conversion devices are adjacent to one another along the longitudinal direction of the line sensor, and the correction processing means for performing the correction processing in order to obtain the final image signal representing the final image.

As the stimulable phosphor sheet for energy subtraction processing, it is possible to employ an anisotropic stimulable phosphor sheet, such as a stimulable phosphor sheet, wherein the light emission region of the stimulable phosphor sheet is partitioned by a stimulating ray reflecting partition member, which extends in the thickness direction of the stimulable phosphor sheet, into a plurality of fine cells.

What is claimed is:

1. A radiation image read-out method, comprising the steps of:
   i) linearly irradiating stimulating rays, which have been produced by a line light source, onto an area of one surface of a stimulable phosphor sheet, on which a radiation image has been stored, the stimulating rays causing the stimulable phosphor sheet to emit light in proportion to an amount of energy stored thereon during its exposure to radiation,
   ii) receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, with a line sensor comprising a plurality of pixel regions arrayed along a length direction of the linear area of the stimulable phosphor sheet, the received light being subjected to photoelectric conversion performed by the line sensor,
   iii) moving the stimulable phosphor sheet with respect to the line light source and the line sensor and in a direction different from the length direction of the linear area of the stimulable phosphor sheet,
   iv) successively reading outputs of the line sensor in accordance with the movement, outputs of the pixel regions at respective positions of movement being thereby obtained, and
   v) obtaining a final image signal, which represents a final image, from the thus obtained outputs of the pixel regions at the respective positions of movement,
   wherein addition processing is performed on the outputs of a plurality of pixel regions constituting the line sensor, which pixel regions are adjacent to one another along the length direction of the linear area of the stimulable phosphor sheet, and which pixel regions have widths taken in the length direction of the linear area of the stimulable phosphor sheet such that a sum of the widths is equal to the width of one pixel in the final image, the width of the one pixel in the final image being taken in the length direction of the linear area of the stimulable phosphor sheet, an image signal component of the final image signal representing the final image, which image signal component represents one pixel in the final image, being thereby obtained.

2. A method as defined in claim 1 wherein the stimulable phosphor sheet contains a stimulable phosphor, which is capable of absorbing light having wavelengths falling within an ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

3. A method as defined in claim 1 or 2 wherein the addition processing is performed immediately after the outputs of the plurality of the pixel regions adjacent to one another along the length direction of the linear area of the stimulable phosphor sheet, which outputs are to be added to one another in order to constitute the image signal component of the final image signal representing one pixel in the final image, have been read.

4. A radiation image read-out apparatus, comprising:
   i) a line light source for linearly irradiating stimulating rays onto an area of one surface of a stimulable phosphor sheet, on which a radiation image has been stored, the stimulating rays causing the stimulable phosphor sheet to emit light in proportion to an amount of energy stored thereon during its exposure to radiation,
   ii) a line sensor for receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, and performing photoelectric conversion of the received light,
   iii) scanning means for moving the stimulable phosphor sheet with respect to the line light source and the line sensor and in a direction different from a length direction of the linear area of the stimulable phosphor sheet, and
   iv) reading means for successively reading outputs of the line sensor in accordance with the movement in order to obtain a final image signal, which represents a final image,
   wherein the line sensor comprises a plurality of pixel regions arrayed along the length direction of the linear area of the stimulable phosphor sheet,
   a width of each of the pixel regions constituting the line sensor, which width is taken in the length direction of the linear area of the stimulable phosphor sheet, is equal to a fraction of the width of one pixel in the final image, the width of the one pixel in the final image being taken in the length direction of the linear area of the stimulable phosphor sheet, and
   the reading means is provided with addition processing means for performing addition processing on the outputs of n number of pixel regions constituting the line sensor, which pixel regions are adjacent to one another along the length direction of the linear area of the stimulable phosphor sheet, where n represents an integral number of at least 2, in order to obtain an image signal component of the final image signal representing the final image, which image signal component represents one pixel in the final image.

5. An apparatus as defined in claim 4 wherein the stimulable phosphor sheet contains a stimulable phosphor, which is capable of absorbing light having wavelengths falling within an ultraviolet to visible region and thereby storing energy of the light having wavelengths falling within the ultraviolet to visible region, and which is capable of being stimulated by light having wavelengths falling within a visible to infrared region and thereby radiating out the stored energy as emitted light.

6. An apparatus as defined in claim 4 or 5 wherein the addition processing means performs the addition processing on the outputs of the n number of the pixel regions adjacent to one another along the length direction of the linear area of the stimulable phosphor sheet, which outputs are to be added to one another in order to constitute the image signal component of the final image signal representing one pixel in the final image, immediately after the outputs of the n number of the pixel regions adjacent to one another have been read.

7. A radiation image read-out method, comprising the steps of:
  i) linearly irradiating stimulating rays, which have been produced by a line light source, onto an area of one surface of a stimulable phosphor sheet, on which a radiation image has been stored, the stimulating rays causing the stimulable phosphor sheet to emit light in proportion to an amount of energy stored thereon during its exposure to radiation,
  ii) receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, with a line sensor comprising a plurality of photoelectric conversion devices arrayed along a length direction of the linear area of the stimulable phosphor sheet, the received light being subjected to photoelectric conversion performed by the line sensor,
  iii) moving the stimulable phosphor sheet with respect to the line light source and the line sensor and in a direction different from the length direction of the linear area of the stimulable phosphor sheet,
  iv) successively reading outputs of the photoelectric conversion devices constituting the line sensor in accordance with the movement, an initial image signal being thereby obtained,
  v) performing addition processing on image signal components of the initial image signal representing the outputs of a plurality of photoelectric conversion devices constituting the line sensor, which photoelectric conversion devices are adjacent to one another along the length direction of the linear area of the stimulable phosphor sheet, an image signal component of an intermediate image signal representing an intermediate image, which image signal component represents one pixel in the intermediate image, being thereby obtained, and
  vi) performing correction processing on the intermediate image signal, a final image signal, which represents a final image, being thereby obtained.

8. A method as defined in claim 7 wherein the correction processing contains at least one of correction processing for compensation for dark current, correction processing for compensation for sensitivity, correction processing for compensation for linearity, correction processing for compensation for shading, and logarithmic conversion processing.

9. A method as defined in claim 7 or 8 wherein at least two kinds of processings, which are among the processings for the correction processing, are performed with one time of table conversion processing.

10. A radiation image read-out apparatus, comprising:
  i) a line light source for linearly irradiating stimulating rays onto an area of one surface of a stimulable phosphor sheet, on which a radiation image has been stored, the stimulating rays causing the stimulable phosphor sheet to emit light in proportion to an amount of energy stored thereon during its exposure to radiation,
  ii) a line sensor for receiving light, which is emitted from the linear area of the one surface of the stimulable phosphor sheet exposed to the linear stimulating rays or from a linear area of the other surface of the stimulable phosphor sheet corresponding to the linear area of the one surface of the stimulable phosphor sheet, and performing photoelectric conversion of the received light, the line sensor comprising a plurality of photoelectric conversion devices arrayed along a length direction of the linear area of the stimulable phosphor sheet,
  iii) scanning means for moving the stimulable phosphor sheet with respect to the line light source and the line sensor and in a direction different from the length direction of the linear area of the stimulable phosphor sheet,
  iv) reading means for successively reading outputs of the photoelectric conversion devices constituting the line sensor in accordance with the movement in order to obtain an initial image signal,
  v) consolidation processing means for performing addition processing on image signal components of the initial image signal representing the outputs of a plurality of photoelectric conversion devices constituting the line sensor, which photoelectric conversion devices are adjacent to one another along the length direction of the linear area of the stimulable phosphor sheet, in order to obtain an image signal component of an intermediate image signal representing an intermediate image, which image signal component represents one pixel in the intermediate image, and
  vi) correction processing means for performing correction processing on the intermediate image signal in order to obtain a final image signal, which represents a final image.

11. An apparatus as defined in claim 10 wherein the correction processing contains at least one of correction processing for compensation for dark current, correction processing for compensation for sensitivity, correction processing for compensation for linearity, correction processing for compensation for shading, and logarithmic conversion processing.

12. An apparatus as defined in claim 10 or 11 wherein the correction processing means performs at least two kinds of processings, which are among the processings for the correction processing, with one time of table conversion processing.

* * * * *